(12) United States Patent
Sirven et al.

(10) Patent No.: US 10,288,143 B2
(45) Date of Patent: May 14, 2019

(54) HYDRAULIC SHOCK ABSORBER WITH COMPRESSION FILTERING

(71) Applicants: Jacques Sirven, Versailles (FR); Marc Sirven, Paris (FR); François Sirven, Paris (FR); Aude Sirven, Paris (FR); Alain Bordier, Veyrier (CH)

(72) Inventors: Jacques Sirven, Versailles (FR); Marc Sirven, Paris (FR); François Sirven, Paris (FR); Aude Sirven, Paris (FR)

(*) Notice: Subject to any disclaimer, the term of this patent is extended or adjusted under 35 U.S.C. 154(b) by 0 days.

(21) Appl. No.: 15/304,498

(22) PCT Filed: Apr. 14, 2015

(86) PCT No.: PCT/EP2015/058001
§ 371 (c)(1),
(2) Date: Oct. 14, 2016

(87) PCT Pub. No.: WO2015/158675
PCT Pub. Date: Oct. 22, 2015

(65) Prior Publication Data
US 2017/0037923 A1    Feb. 9, 2017

(30) Foreign Application Priority Data

Apr. 16, 2014 (FR) .................................. 14 53398

(51) Int. Cl.
*F16F 9/06* (2006.01)
*F16F 9/19* (2006.01)
(Continued)

(52) U.S. Cl.
CPC .............. *F16F 9/512* (2013.01); *B60G 13/08* (2013.01); *B60G 17/08* (2013.01); *F16F 9/061* (2013.01);
(Continued)

(58) Field of Classification Search
CPC ........ F16F 9/36; F16F 9/46; F16F 9/48; F16F 9/486; F16F 9/50; F16F 9/512;
(Continued)

(56) References Cited

U.S. PATENT DOCUMENTS 2,031,000 A    2/1936  Mercier
3,492,013 A *  1/1970  Osbon .................... B60G 17/08
                                                        280/5.508
(Continued)

FOREIGN PATENT DOCUMENTS

DE    10 2007 009 012 B3    6/2008
FR       2 505 267 A1       11/1982
FR       2 838 172 A1       10/2003

OTHER PUBLICATIONS

International Search Report dated Jul. 8, 2015, issued in corresponding International Application No. PCT/EP2015/058001, filed Apr. 14, 2015, 4 pages.

*Primary Examiner* — Pamela Rodriguez
(74) *Attorney, Agent, or Firm* — Christensen O'Connor Johnson Kindness PLLC

(57) ABSTRACT

The invention relates to a shock absorber (1), in particular for a motor vehicle, which comprises: a cylinder (2) containing a hydraulic fluid; a main piston (4) actuated by a rod (3), defining in the cylinder a first main chamber (5) and a second main chamber (6), the second main chamber containing the rod; a hydraulic fluid vessel (24); and a valve (11) placed in the flow of the hydraulic fluid between the first main chamber and the second main chamber or between the first main chamber and the vessel. The valve comprises a mobile gate (14) engaging with a seat (13), a spring (20) tending to urge the gate against the seat thereof, and a mobile valve piston (17, 78), defining a first valve chamber (18, 82) and a second valve chamber (19, 83) in the valve, said mobile valve piston being capable of compressing the spring (Continued)

and closing the gate. The shock absorber also includes a control restriction (15) mounted in the flow of the hydraulic fluid from the first main chamber (5) during a compression movement, the control restriction being capable of generating a pressure difference acting on the respective surfaces of the mobile valve piston in a direction that tends to compress the spring during a compression movement and a means (51) for slowing the movement of the mobile valve piston (17, 78).

15 Claims, 17 Drawing Sheets

(51) Int. Cl.
  *F16F 9/46* (2006.01)
  *B60G 13/08* (2006.01)
  *B60G 17/08* (2006.01)
  *F16F 9/512* (2006.01)

(52) U.S. Cl.
  CPC .................. *F16F 9/19* (2013.01); *F16F 9/46* (2013.01); *B60G 2500/11* (2013.01); *B60G 2800/162* (2013.01); *F16F 2228/066* (2013.01); *F16F 2230/18* (2013.01)

(58) Field of Classification Search
  CPC .. F16F 9/5126; F16F 9/061; F16F 9/19; F16F 2228/066; F16F 2230/18; B60G 13/08; B60G 17/08; B60G 2500/11; B60G 2800/162
  USPC .............. 188/284, 289, 286, 313, 315, 318, 188/322.13; 267/64.15, 64.26
  See application file for complete search history.

(56) References Cited

U.S. PATENT DOCUMENTS

| | | | | |
|---|---|---|---|---|
| 5,586,627 A | * | 12/1996 | Nezu | B60G 17/08 188/266.6 |
| 5,588,510 A | * | 12/1996 | Wilke | F16F 9/064 188/266.6 |
| 7,234,576 B2 | * | 6/2007 | Sirven | B60G 17/08 188/314 |
| 9,156,519 B2 | * | 10/2015 | Ripa | B62K 25/04 |

* cited by examiner

HYDRAULIC SHOCK ABSORBER WITH COMPRESSION FILTERING

TECHNICAL FIELD

The invention relates in general to the field of shock absorbers, notably for motor vehicles.

BACKGROUND

A hydraulic shock absorber, used in particular in a motor vehicle, makes it possible to achieve an appreciable increase in the grip of the tires of the wheels of the motor vehicle with the ground while at the same time damping the movements of the suspended mass of the vehicle. Such a device generally comprises a cylinder filled with hydraulic fluid, inside which there may move a main piston actuated by a rod. The piston defines within the cylinder a first chamber and a second chamber containing the rod. When the piston moves inside the cylinder, the immersed volume of the rod varies, and that leads to a variation in the volume available for the oil inside the cylinder. A reservoir of hydraulic fluid is therefore connected to the cylinder in order to compensate for these variations.

During a compression movement in which the rod enters the cylinder, the hydraulic fluid is displaced by the main piston from the first chamber toward the second chamber. In order to generate a hydraulic force opposing the movement of the suspension, the displaced fluid is passed through restrictions which may be of various types. It is possible to use simple calibrated orifices, check valves made up of foil or light metal components, or even special-purpose valves.

In a conventional shock absorber, the damping force is dependent on the rate of compression or relaxation. Such a response may give rise to problems during a compression movement of the shock absorber. A sudden acceleration experienced by the wheel, for example when passing over small raised obstacles on the roadway, may generate a significant variation in the damping force, it being possible for the resulting jolt to be felt unpleasantly inside the vehicle. In order to avoid such jolts, the damping is generally reduced during a compression. There is then the risk that the damping will not be sufficient to provide suitable control over the movements of the vehicle bodyshell. It is possible to consider increasing the damping during a relaxation in order to overcome this difficulty, but this then results in a risk of a loss of grip when the roadway is rutted, as the wheel of the vehicle will no longer be able to follow the profile of the roadway.

A shock absorber device described in French patent application FR 2 838 172 comprises a valve having a valve shutter. Filtering means are mounted in parallel with the valve in order to generate a control pressure acting on the valve shutter. In such a shock absorber, the variation in pressure between the first and second main chambers of the cylinder of the shock absorber are used to generate, via the filtering means, a control pressure that acts upon the valve shutter. The percussion phenomena encountered in conventional shock absorbers are thus filtered.

Such a shock absorber performs extremely well. However, its structure is complex which means that mass production thereof is difficult to achieve.

The subject of the present invention is a shock absorber capable of overcoming these problems.

SUMMARY

The shock absorber according to the invention needs notably to make it possible to improve the grip of the tire of a wheel of a vehicle with the roadway while at the same time perfectly damping the movements of the vehicle bodyshell. The shock absorber needs to be capable of generating a damping force in compression that does not pass on the effects of the sudden accelerations experienced by the wheel when running over small obstacles raised above the roadway. Finally, these advantageous results need to be obtained by means of a structure that is simple and easily mass-produced.

According to a first aspect of the invention, a shock absorber, notably for a motor vehicle, comprises a cylinder containing a hydraulic fluid, a main piston actuated by a rod, defining within the cylinder a first main chamber and a second main chamber, the second main chamber containing the rod. The shock absorber also comprises a reservoir of hydraulic fluid and a valve placed in the flow of hydraulic fluid between the first main chamber and the second main chamber or between the first main chamber and the reservoir.

The valve comprises a mobile shutter collaborating with a seat, a spring tending to press the valve shutter onto its seat, and a mobile valve piston defining within the valve a first valve chamber and a second valve chamber, said mobile piston being able to compress the spring and close the valve.

The shock absorber further comprises a control restriction mounted in the flow of the hydraulic fluid emanating from the first main chamber during a compression movement, the control restriction being able to generate a pressure difference acting upon the respective faces of the mobile valve piston in a direction that tends to compress the spring during a compression movement of the shock absorber.

Finally, the shock absorber further comprises a means for slowing the movement of the mobile valve piston.

In one exemplary embodiment, the slowing means may comprise a filtering restriction placed in the flow of the fluid caused by the movement of the mobile valve piston. The filtering restriction has passing through it a flow of oil that is dependent on the movement of the mobile valve piston inside the valve, this having the effect of slowing the movement of the mobile piston.

During a compression movement, a large proportion of the fluid expelled from the first main chamber passes through the valve and the control restriction, then arrives at the second main chamber. By means of pipes comprising the filtering restriction, filtered control pressures are applied to the faces of the mobile valve piston. This valve piston, subjected to the action of these hydraulic pressures acting on its faces, compresses the spring and closes the valve. Any variation in the bearing force of the spring results in a variation in the drop of pressure of the oil as it passes through the valve and an accompanying variation in the damping force. The filtering restriction prevents rapid movements of the piston and eliminates the sudden variations in damping force.

By providing both a control restriction and a means of slowing the mobile piston inside the valve, for example in the form of a filtering restriction, it is possible to adapt the pressure difference acting on the valve piston to suit the compression rate while at the same time installing frequency filtering that makes it possible to prevent any sudden variation in damping force, for example when the wheel of the vehicle passes over small raised obstacles on the roadway.

In some cases, it may be advantageous for the filtering to be asymmetric. For this reason the filtering restriction may be designed to slow the flow more in one direction than in the other.

During the relaxation phases, the way in which the shock absorber works is the conventional way, the damping force being dependent only on the speed of the relaxation movement.

In one embodiment, a first circuit connects the first main chamber to a flow split point, a second circuit connects the split point to the second main chamber and a third circuit connects the split point to the reservoir. The valve, like the control restriction, may be arranged on any one of the aforementioned circuits.

The valve and the control restriction may be arranged on two different circuits or on the same circuit. If the valve and the control restriction are arranged on the same circuit, the control restriction may be arranged upstream or downstream of the valve, when considering the flow of the hydraulic fluid during a compression movement.

Because the filtering of the damping force is performed by means of the valve, it is generally desirable for the valve to have the highest possible flow rate of hydraulic fluid passing through it. For that reason, the valve will therefore preferably be placed in the first circuit connecting the first main chamber to the flow split point or, at a push, in the second circuit connecting the split point to the second main chamber. In the latter instance, the pressure in the reservoir needs to be high enough to exceed the pressure at the outlet of the valve, otherwise there will be a risk of cavitation.

In certain exemplary embodiments, however, the shock absorber also acts as a load compensator and the volume and pressure in the reservoir are increased to make it equivalent to a spring. The cross section of the rod of the shock absorber is increased so that the flow flowing in the third circuit is greater than the flow flowing in the second circuit. In that case, the valve may advantageously be placed in the third circuit or even in the second circuit.

In one embodiment, a second control restriction is mounted on one of the aforementioned circuits. The second control restriction is able to generate a pressure difference acting on the respective faces of the mobile valve piston in a direction that tends to reduce the tension in the spring, during a compression movement of the shock absorber.

In an alternative form, the mobile valve piston may comprise two endplates separated by a peripheral groove so as to form, with an interior dividing partition inside the valve, a first auxiliary chamber and a second auxiliary chamber. A filtering restriction is mounted in the flow of the fluid brought about by the movement of the mobile valve piston.

When just one control restriction is provided, the damping force increases as the rate of compression increases. The two control restrictions provided in certain embodiments preferably have different characteristics so as, for example, to cause the damping force to decrease for high speeds of compression movement of the shock absorber (typically upwards of 25 to 30 cm/s). It is thus possible to obtain a compression damping law whereby, as the rate of compression increases, the damping force starts off by increasing, passes through a maximum, and then decreases at high compression rates. This type of law, combined with the slowing of the movement of the mobile valve piston, makes a vehicle equipped with such a shock absorber particularly comfortable.

In another embodiment, the reservoir comprises a gas chamber with a mobile wall arranged in the cylinder near its opposite end to the rod of the main piston. In this embodiment, a single circuit connects the first main chamber to the second main chamber, and the valve is arranged in said circuit with the control restriction upstream or downstream of the valve, when considering the flow of the hydraulic fluid during a compression movement.

In one embodiment, the mobile shutter comprises a contact ring forming a peripheral annular projection on its base and a plurality of axial ducts. Contact between the mobile valve shutter and its seat is thus via the annular projection of the valve shutter, the diameter of this projection being greater than that of the inlet orifice of the valve. The valve lift therefore results in the opening of a larger passage cross section.

Such a structure makes the flow more stable whatever the flow rate.

In certain exemplary embodiments, the valve stem of the mobile shutter comprises a first part having a first cross section and a second part having a second cross section. The valve comprises a first additional chamber and a second additional chamber, inside which chambers the first part of the valve stem of the mobile shutter can move.

Such a design of mobile valve stem combined with such a valve comprising two additional chambers makes it possible to increase the proportion exempt from high frequencies of the damping force.

For preference, the ratio of the first to the second cross section of the mobile valve stem is the same as the ratio of the surface area of the main piston of the shock absorber to the cross section of the rod of the shock absorber.

The force demanded of the spring in order to generate a high pressure drop is small, because the pressure forces exerted on the two opposite faces of the mobile valve shutter partially balance one another.

During the relaxation phases, hydraulic fluid coming from the hydraulic fluid reservoir arrives in the first main chamber. This flow passes via the mobile valve shutter, lifting the shutter off its seat. This has the effect of making it easier for the shutter to return to its start of compression position.

In one embodiment, the reservoir of hydraulic fluid is connected to the first main chamber by a pipe on which there is arranged a connecting piece acting both as a nonreturn check valve and as a point of connection between a plurality of pipes which connect to one another, during a relaxation, the first valve chamber, the second valve chamber and the reservoir.

Such a connecting piece re-equalizes the pressure forces acting on the faces of the mobile valve piston so that the spring is more quickly relaxed and the valve shutter pressed firmly against its seat. In this way, the filtering acts right from the start of compression and the suspension is even more comfortable.

Various alternative ways of arranging the valve with respect to the shock absorber may be provided. In a first alternative form, the valve is arranged on the outside of the cylinder of the shock absorber and is connected to the two main chambers by means of a tube surrounding the cylinder of the shock absorber. In a second alternative form, the valve and the various restrictions are mounted in the main piston, the rod being hollow and causing the valve to communicate with a reservoir arranged at the opposite end of the rod to the main piston.

The reservoir may be formed of an external tube surrounding the cylinder of the shock absorber.

It will be noted that a control restriction in a shock absorber according to the invention may be placed in one of the hydraulic circuits of the shock absorber provided that the flow rate in this circuit is proportional to the speed of the compression movement of the shock absorber. Depending on the way in which such a control restriction is connected to the valve chambers or, where appropriate, the auxiliary chambers of the valve, the difference in pressure created by the restriction will be capable of acting in the direction of closure or direction of opening of the valve shutter.

In addition, when a valve chamber or an auxiliary valve chamber comprises a wall moving with the mobile valve piston, a filtering restriction may be placed on the flow of fluid between this valve chamber or auxiliary chamber and the circuit in which a control restriction is mounted.

In the embodiments described earlier, the control restriction and the filtering restriction generate a pressure drop which is dependent solely on the flow rate passing through them. In other embodiments, it is possible to exert control over the control restriction and/or over the filtering restriction. The pressure drop generated by the controlled restriction or restrictions is then dependent not solely on the flow rate passing through them but also on another parameter, for example a control signal emitted by the on-board computer of the vehicle equipped with the shock absorber of the invention.

In this way, the characteristics of the shock absorber can be regulated remotely thereby obtaining what is referred to as a "controlled shock absorber".

In all the embodiments described hereinabove, the mobile valve piston presses against the spring which it compresses and the amplitude of the movement of the mobile piston is dependent solely on the characteristics of the spring.

In other embodiments, the movement of the mobile valve piston may be limited by providing a limit stop in the path of the piston, said limit stop being provided inside one of the valve chambers. In general, this limit stop is fixed. In some embodiments, this limit stop may be mobile and moved under the action of a remote control in order to obtain a controlled shock absorber.

DESCRIPTION OF THE DRAWINGS

Other objects, features and advantages of the invention will become apparent from reading the following description of a number of embodiments which merely constitute non-limiting examples and which is given with reference to the attached drawings in which.

DETAILED DESCRIPTION

Figure 1:
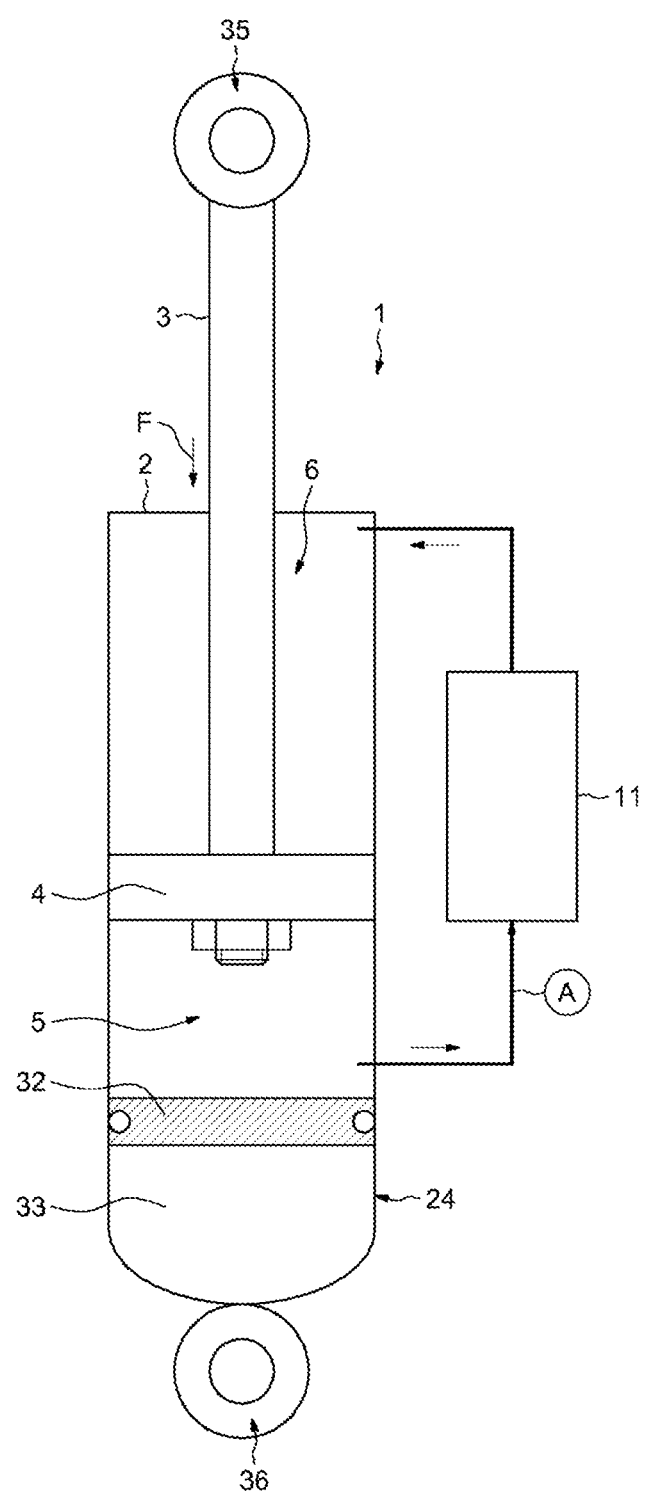
FIG. 1 very schematically shows a first example of a shock absorber.

The shock absorber 1 comprises a cylinder 2 inside which there is mounted a sliding rod 3, connected to a main piston 4 delimiting, inside the cylinder 2, a first main chamber 5 and a second main chamber 6, the second chamber 6 containing the rod 3. At the opposite end of the cylinder 2 to the rod 3 there is a reservoir 24 provided with a reservoir piston 32 sliding inside the cylinder 2 and delimiting a reservoir chamber 33 filled with a gas. At the end of the main rod 3 there is a first eye 35 intended to allow for connection to the bodyshell of the vehicle. At the end of the cylinder 2 there is a second eye 36 intended to allow connection to a member connected to one of the wheels of a vehicle.

The shock absorber 1 comprises a valve 11 arranged in a circuit A connecting the first chamber 5 to the second chamber 6.

During a compression movement indicated schematically by the arrow F, the fluid escapes from the first chamber 5, passes through the valve 11 and returns to the second chamber 6 following the circuit indicated by arrows in the figure. The increase in the immersed volume of the rod 3 is compensated for by a downward movement of the reservoir piston 32.

Figure 2:
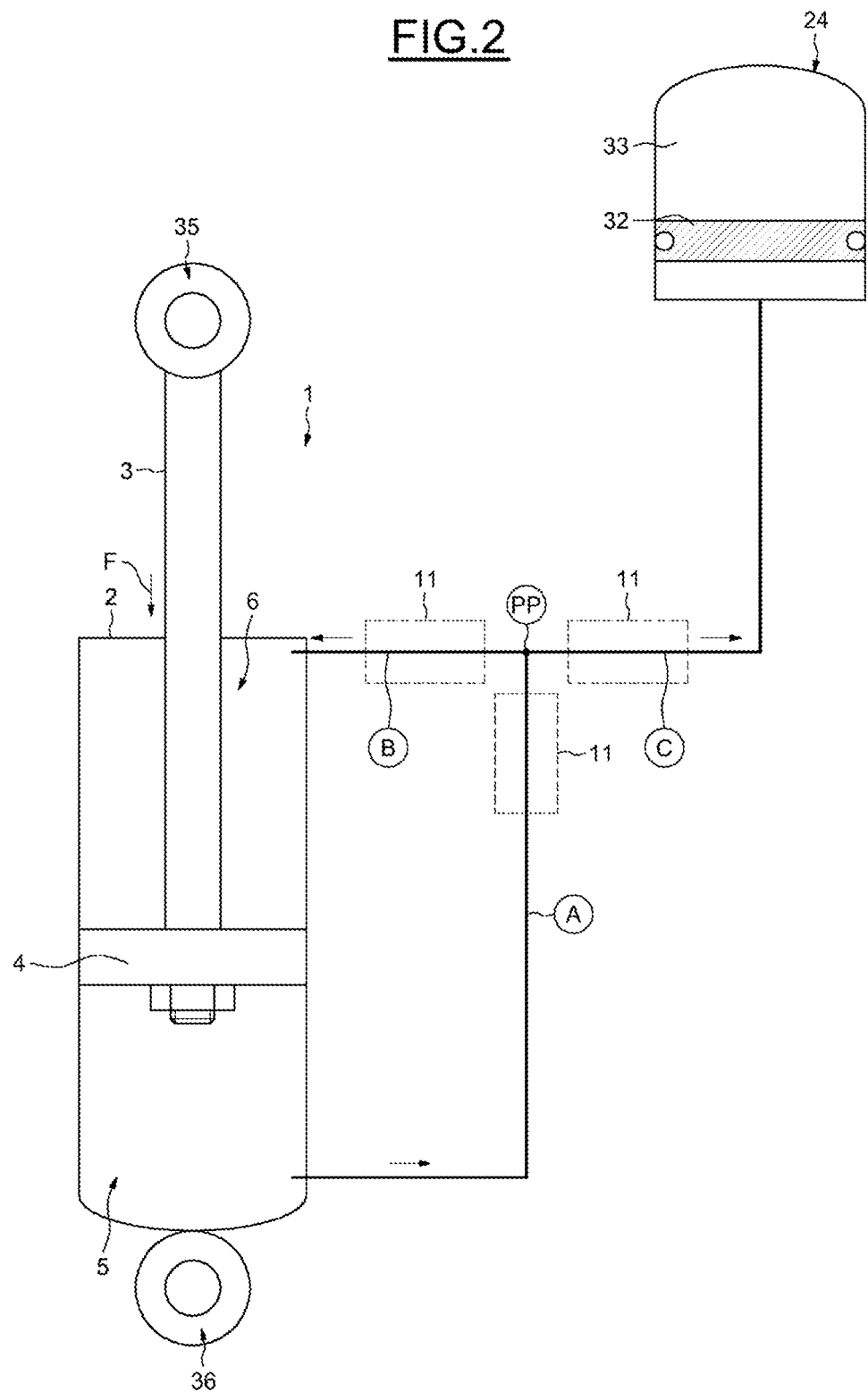
FIG. 2 very schematically illustrates a second example of a shock absorber.

FIG. 2 very schematically illustrates a second example of a shock absorber according to the invention. The elements that are identical bear the same references.

In this second example, the reservoir 24 is placed outside the cylinder 2. Three hydraulic circuits referenced A, B and C in the figure may be defined and these meet at a split point PP. Circuit A connects the first chamber 5 to the split point PP. Circuit B connects the split point PP to the second chamber 6, and circuit C connects the split point PP to the reservoir 24. The direction in which the fluid flows in a compression movement symbolized by the arrow F is indicated by arrows. The valve 11 may be arranged on one of the circuits A, B or C, three positions being indicated in dotted line in the figure.

Figure 3:
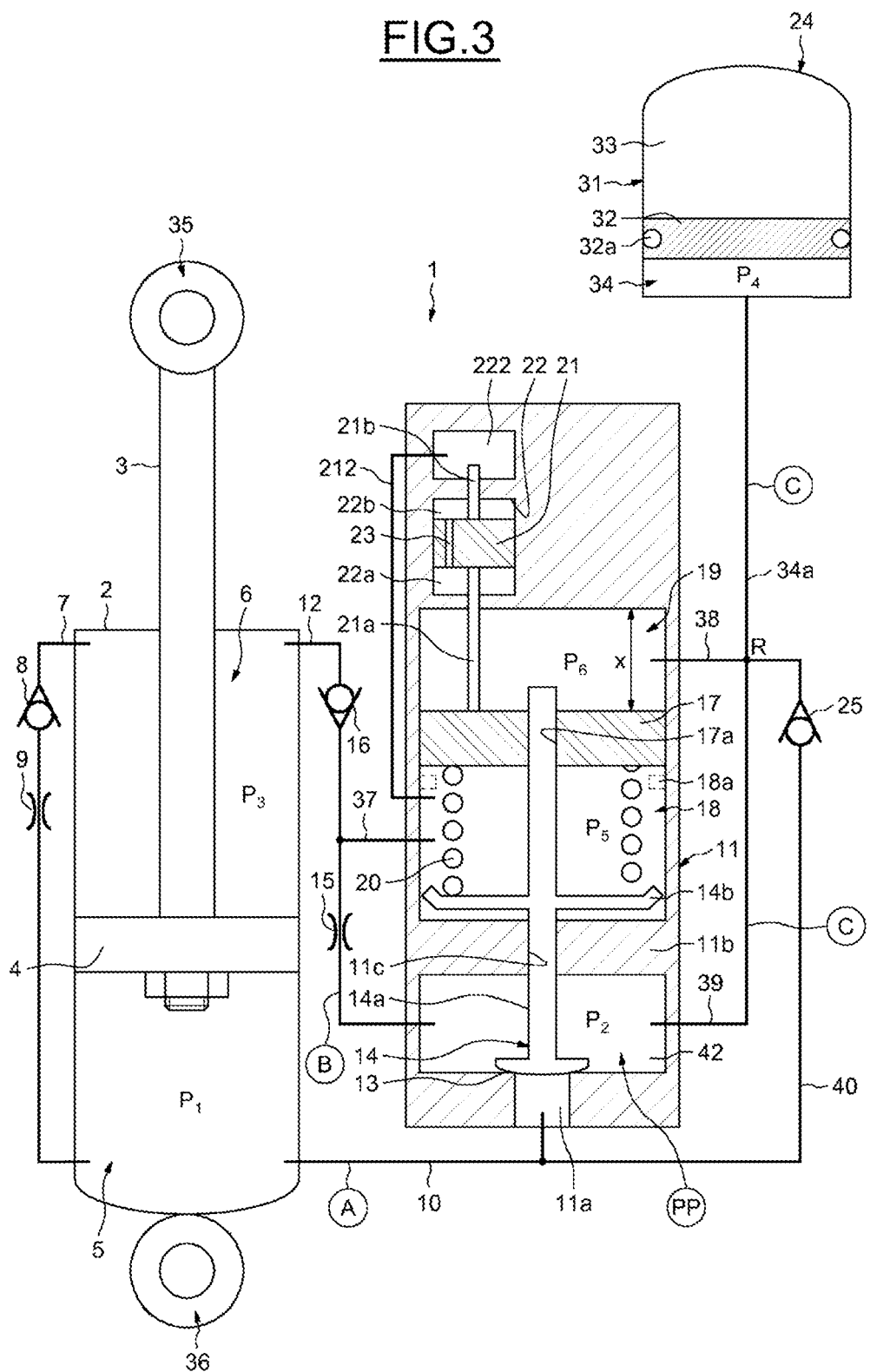
FIG. 3 schematically illustrates a shock absorber according to a first embodiment of the invention, FIG. 4 schematically illustrates a shock absorber according to a second embodiment of the invention, FIG. 5 schematically illustrates a shock absorber according to a first alternative form of the second embodiment of the invention, FIG. 6 schematically illustrates a shock absorber according to a second alternative form of the second embodiment of the invention, FIG. 7 schematically illustrates a shock absorber according to a third alternative form of the second embodiment of the invention.

FIG. 3 schematically illustrates an embodiment of a shock absorber according to the invention corresponding to the example of FIG. 2. The elements which are identical bear the same references. The valve 11, arranged in circuit A has a fluid inlet orifice 11a delimited by a seat 13. The orifice 11a may be closed to a greater or lesser extent by a mobile valve shutter 14 collaborating with the seat 13. The mobile shutter 14 may move within a valve chamber 42 made in the valve 11. The mobile shutter 14 comprises a part 14a in the form of a valve stem, able to slide in a bore 11c made in an internal wall 11b arranged inside the valve 11. The mobile shutter 14 also comprises a shoulder 14b in the shape of a hollow disk secured to the stem 14a and situated, with respect to the internal wall 11b, on the other side of the seat 13.

The valve 11 further comprises a mobile valve piston 14 sliding inside the valve 11 and delimiting a first valve chamber 18 and a second valve chamber 19. A spring 20, here in the form of a helical spring, is arranged inside the valve chamber 18 between a face of the mobile valve piston 17 and the shoulder 14b of the mobile shutter 14. It will be noted that the valve stem 14a of the mobile valve shutter can slide in a bore 17a made in the mobile valve piston 17. In the example illustrated, the mobile valve piston 17 is also secured, via a spacer rod 21a, to a slowing piston 21 sliding in a housing 22 made in the body of the valve 11. The slowing piston 21 has passing through it a nozzle 23 that allows the fluid to flow from one side of the piston 21 to the other as this piston moves. The flow of the fluid is limited by the diameter of the nozzle 23, thereby slowing the movement of the slowing piston 21 and therefore of the mobile valve piston 17. In order to equalize the pressure forces applied to the unit assembly made up of the valve piston 17 and the slowing piston 21, a second spacer rod 21b is fixed to the slowing piston 21. The second rod 21b is shorter than the rod 21a and its end moves in an equalizing chamber 222. The equalizing chamber 222 is placed at the pressure P5 of the first valve chamber, by means of a pipe 212.

The shock absorber also comprises a hydraulic fluid reservoir 24 equipped with a reservoir piston 32 sliding in a sealed manner by means of a seal 32a in an enclosure 31 and delimiting therein a first reservoir chamber 33 filled with a gas and a static pressure chamber 34 that receives the hydraulic fluid. The purpose of the reservoir is to compensate for variations in volume in the cylinder 2 caused by the submerged part of the rod 3 as the shock absorber 1 relaxes or is compressed. The chamber 34 is connected by an extension pipe 34a to a connection point R. Hereinafter, the expressions "connected to the reservoir 24" or "connected to the chamber 34" are to be understood as meaning that the component is connected to the connection point R of the extension pipe 34a of the chamber 34 of the hydraulic fluid reservoir 24. The reservoir 24 is thus mounted outside the circuit C.

The shock absorber 1 comprises a relaxation pipe 7, between the first main chamber 5 and the second main chamber 6. The pipe 7 comprises a nonreturn check valve 8, allowing the hydraulic fluid to circulate from the second main chamber 6 toward the first main chamber 5. The relaxation pipe 7 is also equipped with a relaxation restriction 9.

The shock absorber 1 also comprises a first compression pipe 10 between the first main chamber 5 and the inlet orifice 11a of the valve 11 and a second compression pipe 12 connecting the second main chamber 6 to the valve shutter chamber 42 of the valve 11. The pipes 10 and 12 correspond respectively to circuits A and B in FIG. 2.

Mounted on the pipe 12 corresponding to circuit B are a control restriction 15 and a nonreturn check valve 16, preventing fluid from circulating from the second main chamber 6 toward the valve 11, so that the circulation is established only when the shock absorber is working in compression.

The valve 11 is, in this embodiment, mounted on circuit A, the split point PP being situated in the valve shutter chamber 42 between the first main chamber 5 and the second main chamber 6. During a compression movement, the hydraulic fluid flows from the first main chamber 5 through the pipe 10 corresponding to circuit A, part of the fluid then passing through the valve shutter chamber 42 corresponding to the split point PP before returning to the second main chamber 6 via the pipe 12 corresponding to circuit B. The shock absorber 1 furthermore comprises a pipe 37 tapped off the pipe 12, between the nonreturn check valve 16 and the control restriction 15, and communicating with the first valve chamber 18 of the valve 11. A pipe 38 is arranged between the connection point R and the second valve chamber 19. A pipe 39 connects the connection point R to the valve shutter chamber 42 of the valve 11. Circuit C in FIG. 2 comprises the pipes 39 and 34a. A pipe 40 connects the connection point R to the first main chamber 5 of the shock absorber via the pipe 10. The pipe 40 comprises a nonreturn check valve 25 preventing hydraulic fluid from flowing from the first main chamber 5 toward the connection point R and the chamber 34 of the hydraulic fluid reservoir 24.

The way in which the shock absorber works will now be described. The variable distance between the mobile valve piston 17 and the upper part of the second valve chamber 19 is denoted x. x therefore defines the position of the valve piston 17 within the valve 11.

The pressures are denoted as follows:
P1 is the pressure in the first main chamber 5,
P2 is the pressure in the valve shutter chamber 42,
P3 is the pressure in the second main chamber 6,
P4 is the pressure in the chamber 34 of the reservoir 24,
P5 is the pressure in the first valve chamber 18, and
P6 is the pressure in the second valve chamber 19.

When the shock absorber is working in relaxation, the rod 3 extends from the cylinder 2. The hydraulic fluid expelled from the second main chamber 6 follows the relaxation pipe 7 toward the first main chamber 5. The relaxation restriction 9 then generates a relaxation damping force. The nonreturn check valve 16 isolates the valve 11 which plays no part during the relaxation. During operation in relaxation, the immersed part of the rod experiences a decrease in volume. In order to compensate for this decrease in volume, the reservoir 24 supplies hydraulic fluid to the first main chamber 5 from the chamber 34 through the connection point R then the nonreturn check valve 25 and the pipe 40.

It will be noted that operation in this relaxation embodiment is comparable with that of shock absorbers not equipped with valves and known from the prior art.

When the shock absorber is operating in compression, the pressure P3 of the second main chamber 6 decreases sharply. The nonreturn check valve 16 allows the fluid to circulate. Via the pipes 12 and 37, the first valve chamber 18 is placed at the pressure of the second main chamber 6.

Therefore: P3=P5.
Via the pipes 38 and 39: P2=P4=P6
The operation of the shock absorber working in compression can therefore be described using only pressures P1, P2 and P3.

During a comparison, the fluid is expelled from the first main chamber 5 and can follow neither the relaxation pipe 7, because of the nonreturn check valve 8, nor the pipe 40, because of the nonreturn check valve 25. It therefore follows the first pipe 10 and enters the valve shutter chamber 42 of the valve 11 via the inlet orifice 11a. The hydraulic fluid is slowed by the mobile valve shutter 14 pressing against its seat 13 and experiences a pressure drop P1–P2. It then splits into two flows. The larger flow reaches the second main chamber 6 by passing through the control restriction 15, which creates a pressure drop P2–P3. The smaller second flow reaches the reservoir 24 via the pipes 39 and 34a. It is associated with the increase in volume of the immersed part of the rod 3.

The first valve chamber 18 is subjected to a pressure P5 which is equal to the pressure P3 of the second main chamber 6. The second valve chamber 19 is subjected to a pressure P6 which is equal to the pressure P4 of the reservoir 24, which moreover is equal to the pressure P2 prevailing in the valve shutter chamber 42. The pressures P2 and P3 are therefore applied to the two respective faces of the mobile valve piston 17, which compresses the spring 20. This has the effect of pressing the mobile valve shutter 14 onto its seat 13 and of increasing the difference in pressure between P1 and P2. This finally results in an increase in the damping force.

Because the slowing piston 21 equipped with its nozzle 23 is connected to the mobile valve piston 17, it slows the movements thereof. The damping force is therefore subjected to a filtering.

How this works can be explained in detail using the following calculations.

Definitions are hereafter as follows:
FA: the damping force,
F: the force applied by the pressures P1 and P3 to the rod 3,
ST: the cross section of the rod 3,
FR: the force exerted by the spring 20,
k: the stiffness of the spring 20,
SP: the surface area of the main piston 4,
SC: the surface area of the valve piston 17,
SV: the cross section of the mobile valve shutter 14 subjected to the difference in pressure P1–P2, and
A: a proportionality coefficient connecting the slowing force of the slowing piston 21 to the rate of travel thereof.

In order to obtain the damping force FA, the value of the force resulting from the static pressure P4 of the reservoir 24, which is equal to the pressure P2, over the cross section ST of the rod 3 needs to be subtracted from the force F exerted on the rod 3, using the relationship:

$$FA = F \mid P2 \cdot ST$$

The force F exerted on the rod 3 can be expressed using the following relationship:

$$F = P1 \cdot SP - (SP - ST) \cdot P3$$

The following relationship:

$$FA = SP \cdot (P1 - P2) + (SP - ST) \cdot (P2 - P3)$$

is deduced from the previous two relationships.

This damping force therefore contains two terms which we shall denote F1 and F2.

So:

$$F1 = SP \cdot (P1 - P2)$$

$$F2 = (SP - ST) \cdot (P2 - P3)$$

The previous relationship can therefore be written FA=F1+F2.

F1 is dependent on the difference between the pressures P1 and P2 which difference is created by the mobile shutter 14 of the valve, and F2 is dependent on the difference between the pressures P2 and P3 which difference is created by the passage of the hydraulic fluid through the control restriction 15. We shall now show the term F1 filters out high frequencies and that the term F2 is small in comparison with the term F1.

The force FR exerted by the spring 20 can be expressed in three different ways:

$$FR = k \cdot x; \qquad (1)$$

$$FR = (P2 - P3) \cdot SC - A \cdot dx/dt; \qquad (2)$$

and $$FR = SV \cdot (P1 - P2). \qquad (3)$$

From (3) it is possible to write the relationship (4):

$$FR = F1 \cdot (SV/SP) \qquad (4)$$

From (1) and (4) it is possible to deduce the relationship (5):

$$x = (1/k) \cdot (SV/SP) \cdot F1 \qquad (5)$$

By combining (1) and (2) the filtering equation appears:

$$kx + A \cdot (dx/dt) = SC \cdot (P2 - P3).$$

Which, taking relationship (5) into consideration, can be rewritten:

$$F1 + [A/k] \cdot [dF1/dt] = [SC \cdot SP/SV] \cdot (P2 - P3) \qquad (6)$$

whereas $$F2 = (SP - ST) \cdot (P2 - P3) \qquad (7)$$

Relationships (6) and (7) therefore show that the force F1 is filtered by a first-order low-pass filter and that it, like F2, is proportional to the difference in pressure (P2–P3) which is generated by the control restriction 15.

By comparing the two proportionality coefficients [SC·SP/SV] in the case of F1 and (SP–ST) in the case of F2, it is found that F1 is far larger than F2. Specifically, the cross section SV is less than the cross section SC of the valve piston (it may for example be 16 to 18 times lower). The coefficient of F1 is far higher than that of F2.

The control restriction 15 generates only pressure drops of 1 to 2 bar, giving rise to a drop in pressure across the valve 11 that is far greater since it is multiplied by the aforementioned proportionality coefficient.

By means of the low-pass filter, the shock absorber is able to eliminate 90% of the high-frequency hammering generated by a conventional shock absorber in the compression phase. Other embodiments set out hereinafter may allow this response to be improved further.

In some cases, it may be advantageous to limit the damping force in compression by limiting, for example by using a limit stop, the movement of the mobile piston 17. To do that it is possible to make provision for adding, in the first valve chamber 18, an optional limit stop which has been depicted in FIG. 3 in dotted line and referenced 18a. Thanks to the limit stop 18a, the force exerted by the spring 20 on the valve shutter 14 cannot exceed a certain value, thus placing an upper limit on the damping force in compression.

The control restriction 15 generates a pressure difference which is dependent solely on the flow rate passing through it. In an alternative form, it is possible, without departing from the scope of the invention, to envision using a controllable control restriction. It is then possible, by remotely altering the characteristic of the control restriction, for example as a function of the speed of the vehicle, to adjust the damping law.

Figure 4:
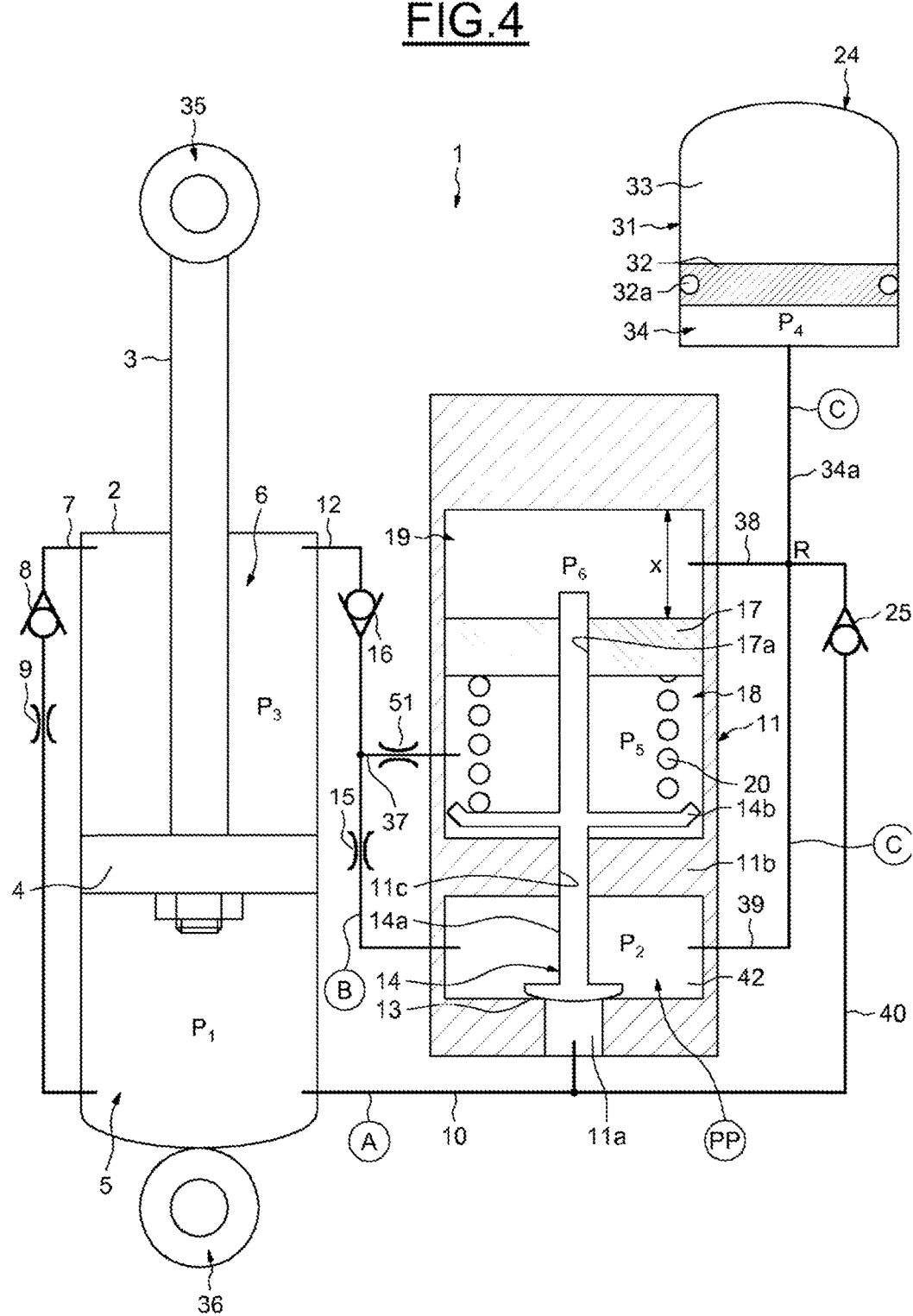

A second embodiment of the shock absorber 1 can be seen in FIG. 4 in which elements that are identical bear the same references. FIG. 4 in particular again shows the control restriction 15 arranged in the same way in circuit B. However, in the embodiment of FIG. 4, the slowing of the movement of the valve piston 17 is no longer obtained by a slowing piston but is obtained by a filtering restriction 51 arranged on the pipe 37 connecting the first valve chamber 18 to circuit B.

Through the pipes 38, 39 and 40, the pressure in the second valve chamber 19 and that in the valve shutter chamber 42 of the valve 11 are both equal to the pressure P4 of the reservoir 24. Keeping the same pressure notation as used in FIG. 3, the relationship can be written thus: P2=P4=P6.

Operation in relaxation is the same as in the first embodiment.

During operation in compression, the fluid expelled from the first main chamber 5 follows the first compression pipe 10 and the inlet orifice 11a of the valve 11. The hydraulic fluid is slowed by the mobile valve shutter 15 then splits into a first flow which arrives in the second main chamber 6 by passing through the control restriction 15 and a second flow which arrives in the hydraulic fluid reservoir 24.

The second valve chamber 19 is subjected to a pressure P6 equal to the pressure P4 of the reservoir. The first valve chamber 18 is connected via the filtering restriction 51 to the second main chamber 6 subjected to the pressure P3. The filtering restriction 51 therefore generates a pressure drop P5–P3. The pressures P2 and P5 are therefore applied to the two faces of the valve piston 17, which compresses the spring 20.

The filtering restriction 51 arranged on the pipe 37 allows the damping force to be filtered in the same way as the auxiliary piston 21 and the restriction 23 of FIG. 3.

Specifically, equations (1) and (3) which define the force FR exerted by the spring remain unchanged and equation (2) is replaced by the equation:

$$FR=(P2-P3) \cdot SC-(P5-P3) \cdot SC \quad (2')$$

Now, the pressure drop (P5–P3) is proportional to the speed at which the valve piston 17 moves, and this is expressed by the relationship: $P5-P3=A'/SC \cdot dx/dt$ where A' is a proportionality coefficient, which means that:

$$FR=(P2-P3) \cdot SC-A' \cdot dx/dt \quad (2')$$

The three equations (1), (2') and (3) are strictly comparable with the equations (1), (2) and (3) resulting from the embodiment of FIG. 3 and which made it possible to demonstrate that the main part F1 of the damping force FA was filtered by a first-order low-pass filter.

The same calculation can be performed each time there is a filtering restriction on a pipe connecting one of the valve chambers to any one of the circuits A, B or C. Any restriction arranged on such a circuit is able to perform filtering on the damping force.

In practice, the pressure drop generated by a filtering restriction is not strictly proportional to the flow rate passing through it. The first-order filtering is a (fairly exact) approximation of the process that allows the elimination of the high frequencies in the damping law.

As in the example of FIG. 3, the difference in pressure generated by the control restriction 15 and the thrust exerted by the spring 20 thus allow control over the closure of the valve shutter 14 which slows the passage of the fluid.

The damping force, which is dependent on the closure of the mobile valve shutter 14 can therefore be subjected to the same calculations as those established for the first embodiment. The damping force is also the sum of two terms, one of which is small in comparison with the other, a first-order low-pass filter proportional to the pressure difference (P2–P3) generated by the control restriction 15 being applied to the larger term expressing the damping force.

This shock absorber therefore allows the same improvement to the response to a disturbance.

Just as with the control restriction 15, it is possible to envision using a filtering restriction with a controllable characteristic. This means that the characteristic of the shock absorber can be adjusted according to parameters other than the rate of compression, such as the speed of the vehicle.

Figure 5:
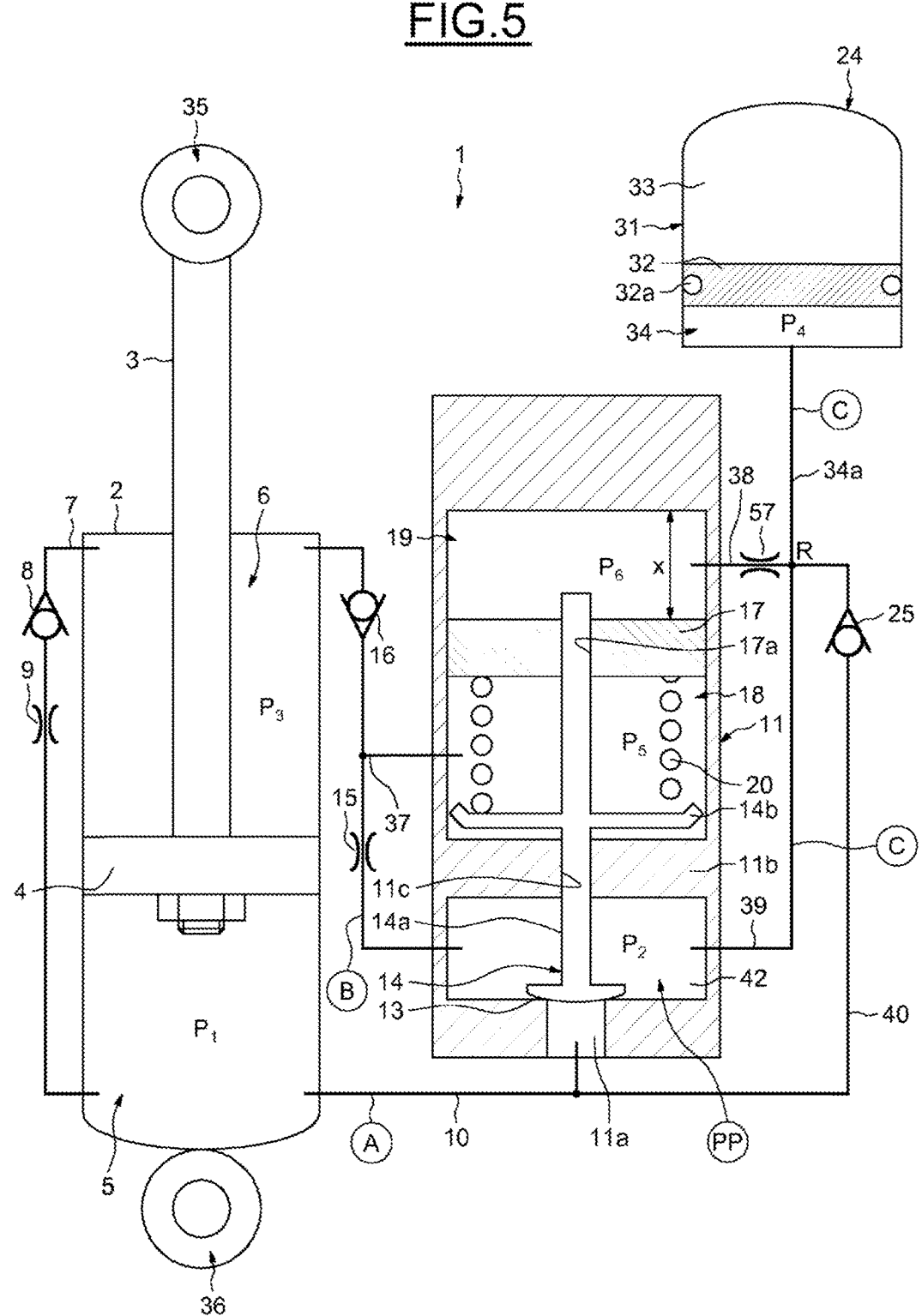

FIG. 5, in which elements that are identical bear the same references, is an alternative form of the second embodiment, differing therefrom in terms of the position of the filtering restriction.

A filtering restriction 57 is in fact mounted on the pipe 38 connecting the second valve chamber 19 to circuit C, whereas the valve 11 is still mounted in circuit A, and the control restriction 15 in circuit B.

In this alternative form, therefore: P4=P2 and P5=P3.

The operation in relaxation is the same as in the case of FIGS. 3 and 4.

During operation in compression, the fluid expelled from the first main chamber 5 is slowed by the mobile valve shutter 14, creating the pressure drop P1–P2. Part of the flow of fluid flows through the control restriction 15, creating the pressure drop P2–P3 and arrives at the second main chamber 6.

The first valve chamber 18 is subjected to a pressure P5 equal to the pressure P3 of the second main chamber 6. The second valve chamber 19 is connected via the filtering restriction 57 to the hydraulic fluid reservoir 24 by the connection point R. The filtering restriction 57 generates a pressure drop P2–P6. The pressures P3 and P6 are therefore applied to the two respective faces of the valve piston 17, which compresses the spring 20.

In the same way as in the example in FIG. 4, the difference in pressure acting on the mobile valve shutter 14 is obtained from the control restriction 15 and from the filtering restriction 57 communicating with one of the valve chambers (in this instance the valve chamber 19).

The damping force therefore contains a dominant term that is filtered by a first-order low-pass filter and proportional to the pressure difference (P2–P3) generated by the control restriction 15.

Figure 6:
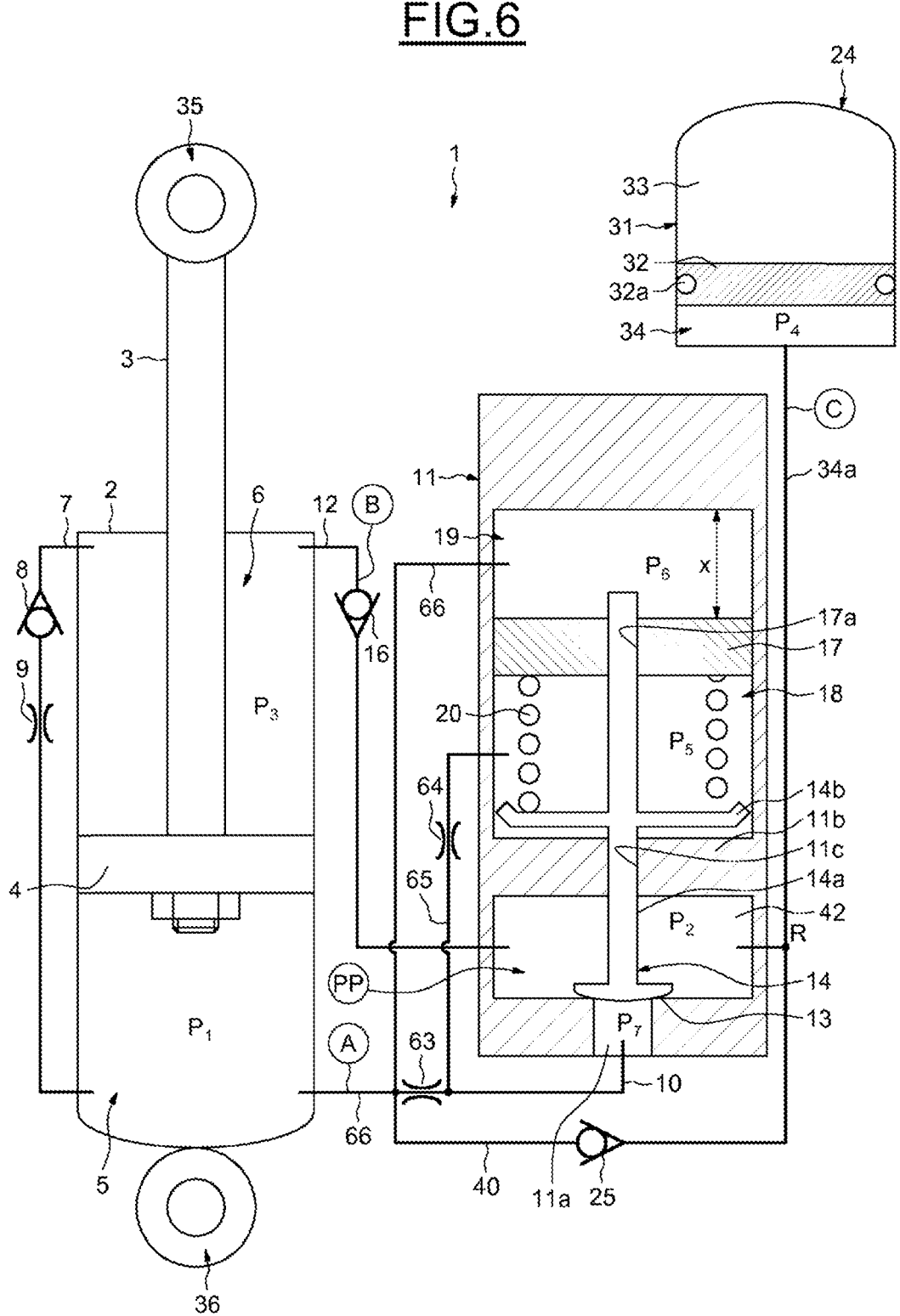

FIG. 6, in which elements that are identical bear the same references, depicts a second alternative form of the second embodiment, illustrating a new position for the control restriction.

The shock absorber illustrated in FIG. 6 differs from the shock absorber of FIG. 4 in that the control restriction 63 is mounted on the pipe 10 in the flow of fluid between the first main chamber 5 and the valve shutter chamber 42 of the valve 11, namely on circuit A like the valve itself.

A pipe 65 connects the inlet orifice 11a of the valve and the first valve chamber 18. A pipe 66 is arranged between the first main chamber 5 and the second valve chamber 19.

The pipe 65 is equipped with a filtering restriction 64. Because of the absence of restriction on the second compression pipe 12, the second main chamber 6 is subjected in compression to the static pressure P4 of the hydraulic fluid reservoir 24. In other words: P3=P4.

The following relationships apply: P3=P4=P2 and P6=P1. A new pressure P7 at the inlet 11a of the valve is defined.

During operation in compression, the fluid expelled from the first main chamber 5 flows through the control restriction 63, creating the pressure drop P1–P7. The fluid then arrives at the inlet of the valve 11 at the pressure P7. It is then slowed by the mobile valve shutter 14, creating the pressure drop P7–P2.

The first valve chamber 18 is connected via the filtering restriction 64 to the inlet orifice 11a of the valve 11, subjected to the pressure P7. The filtering restriction 64 then generates a pressure drop P5–P7. The second valve chamber 19 is subjected to a pressure P6 equal to the pressure P1 of the first main chamber 5. The pressures P1 and P5 are therefore applied to the respective faces of the mobile valve piston 17, which compresses the spring 20.

In the same way as in the previous examples, the difference in pressure acting on the mobile valve shutter 14 is obtained from a control restriction 63 and from a filtering restriction 64 communicating with one of the valve chambers (in this instance the first valve chamber 18).

Thus, in this alternative also, the damping force is filtered by a first-order low-pass filter and proportional to the pressure difference (P1–P7) generated by the control restriction 63 mounted upstream of the valve 11.

Operation in relaxation is the same as in the cases of FIGS. 3, 4 and 5.

Figure 7:
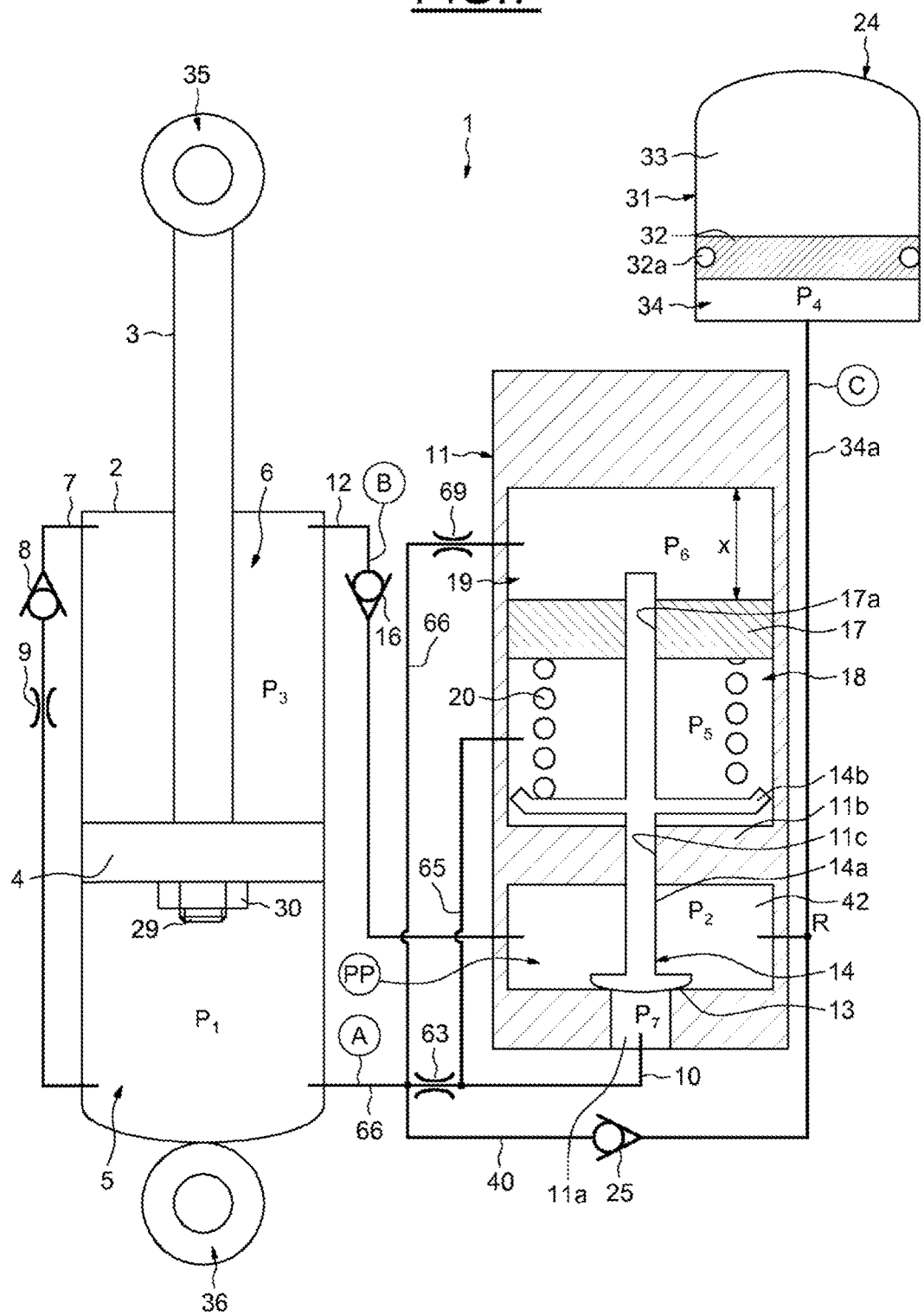

FIG. 7, in which elements that are identical bear the same references, depicts a third alternative form of this second embodiment. The shock absorber illustrated in FIG. 7 differs from the shock absorber of FIG. 6 in that the filtering restriction 69 is mounted on the pipe 66 connecting the second valve chamber 19 to the circuit A. The filtering restriction generates a pressure drop P1–P6.

In this example, in compression: P5=P7 and P3=P4=P2.

The pressures P6 and P7 are therefore applied to the respective faces of the mobile valve piston 17, which compresses the spring 20.

In the same way as in the previous examples, the pressure difference acting on the mobile valve shutter 14 is obtained from a control restriction 63 and from a filtering restriction 69 communicating with one of the valve chambers.

Thus, in this alternative form also, the damping force is filtered by a first-order low-pass filter and proportional to the pressure difference (P1–P7) generated by the control restriction 63.

FIGS. 4, 5, 6 and 7 therefore illustrate four alternative forms of the second embodiment of a shock absorber exhibiting an improved response to an acceleration of the wheel. In the four alternative forms, the valve placed in circuit A between the first main chamber 5 and the second main chamber 6 slows the flow of the fluid by means of a mobile valve shutter the opening of which is dependent on the difference between two pressures. These two pressures are obtained by means of:

a control restriction mounted on one of the circuits A (FIGS. 6 and 7) or B (FIGS. 4 and 5), and a filtering restriction, mounted on a duct connecting one of the valve chambers to one of the circuits A (FIGS. 6 and 7), B (FIG. 4) or C (FIG. 5).

As an alternative, the control restriction may also be mounted on circuit C, provided its inlet is connected to the second valve chamber 19 and its outlet to the first valve chamber 18. The filtering restriction is then arranged, without preference as to location, either on the duct connecting the first valve chamber to the circuit C or on the duct connecting the second valve chamber to the circuit C.

Figure 8:
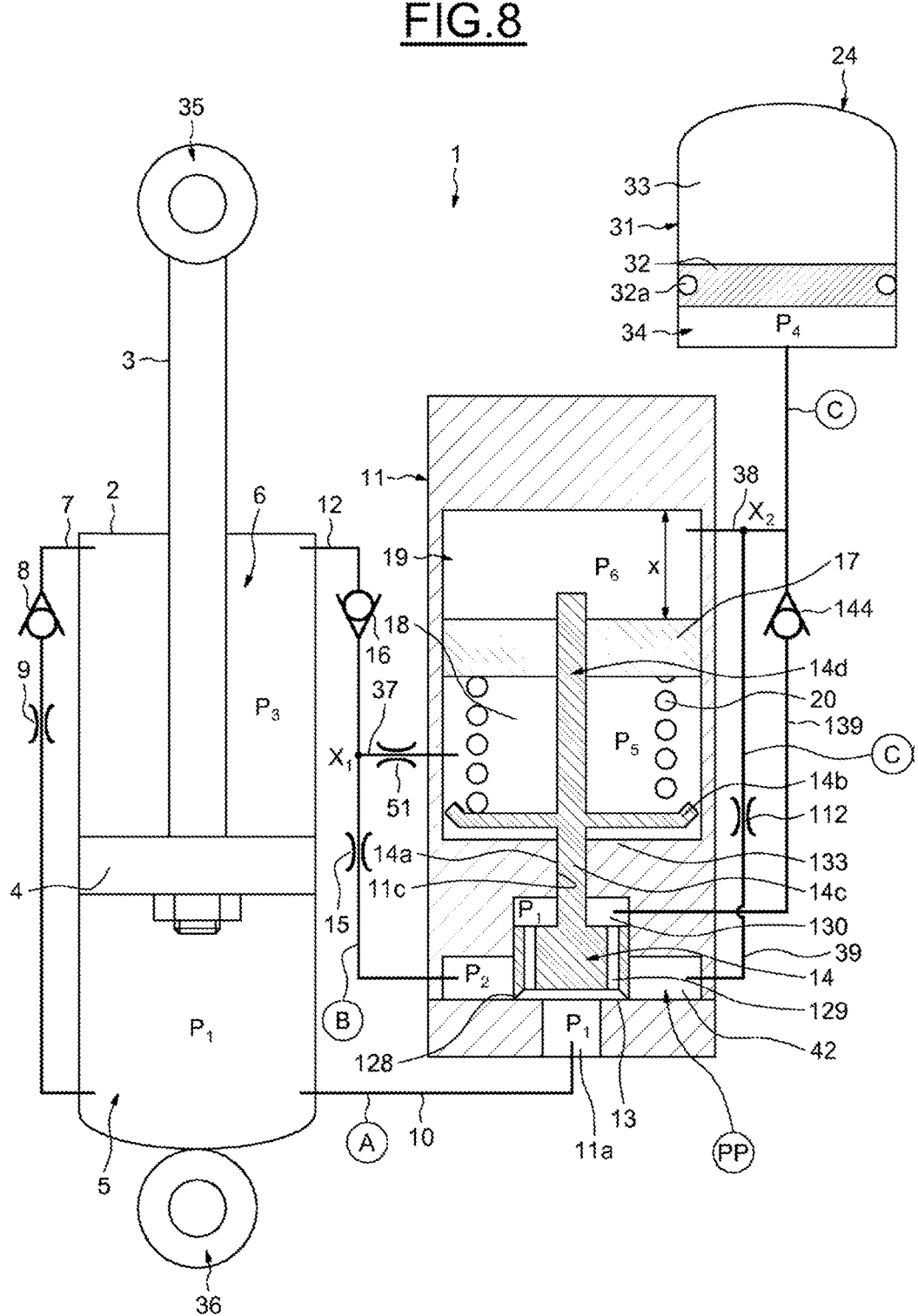
FIG. 8 illustrates a shock absorber according to a third embodiment.

FIG. 8 illustrates an example of a shock absorber according to a third embodiment with a control valve and two control restrictions with different characteristics. Such a shock absorber allows more finely tuned control over the damping force in response to a disturbance.

The pipes 10 (circuit A), 12 (circuit B) and 39 (circuit C) connect the valve 11 to, respectively, the first main chamber 5, the second main chamber 6 and the reservoir chamber 34, the split point PP being situated in the chamber 42. The pipe 37 connects the first valve chamber 18 to a point X1 on the pipe 12 and the pipe 38 connects the second valve chamber 19 to a point X2 on the pipe 39. The valve shutter 14 is able to move in an additional chamber 130 connected to the reservoir 34 by a pipe 139. The pipe 139 is equipped with a nonreturn check valve 144 arranged in such a way that it allows the hydraulic fluid to pass only when the shock absorber is operating in relaxation.

The valve shutter 14 comprises several axial through-ducts 129, two of which are visible in the cross-sectional view of FIG. 8. Fluid from the first main chamber 5 can pass through the axial ducts 129 and enter the additional chamber 130. In this way, the valve shutter 14 is subjected to the same pressure on its lower cross section in the valve shutter chamber 42 and on its higher cross section in the additional chamber 130. Finally, this pressure P1 is applied only to the cross section of the valve stem 14a. That decreases the force that needs to be applied by the spring 20 in order to cause it to move, as compared with the previous examples.

Thanks to this special shape of the valve shutter 14, the surface area of the valve shutter 14 that is subjected to the resultant of the pressure forces P1 of the inlet orifice 11a and of the additional chamber 130 of the valve 11 is known very precisely. Specifically, the pressure P1 is applied to the difference between the lower surface area and the higher surface area of the valve shutter 14. This difference is a constant surface area: the cross-sectional area of the valve stem 14a. It is not necessarily as easy to determine this surface area for other valve shutter geometries. In particular, in a mobile valve shutter such as that of the first embodiment illustrated in FIG. 3, at the moment at which the valve shutter lifts off its seat, hydraulic forces tending to open it further may appear on the outside of the zone of contact and make the cross section to which the pressure P1 of the inlet orifice 11a is applied vary.

The valve 11 comprises a first control restriction 15 mounted on the pipe 12, between the split point PP and the point X1 and a second control restriction 112 mounted on the pipe 39 between the split point PP and the point X2. The second control restriction 112 preferably exhibits characteristics that differ from those of the first control restriction 15. A filtering restriction 51 is mounted on the pipe 37. Thus, the control valve 11 is situated on circuit A, the first control restriction 15 being on circuit B, and the second control restriction 112 being on circuit C.

The pressures in the valve chambers 18 and 19 are denoted P5 and P6, as in FIG. 2, and the pressure in the valve shutter chamber 42 is denoted P2. It is noted that the pipes and the restrictions imply the following equality: P6=P4.

The fluid expelled from the first main chamber 5 during a compression follows the pipe 10 and is then slowed by the valve shutter 14, which gives rise to the pressure drop P1–P2. A large proportion of the flow is directed toward the second main chamber 6, passing through the first control restriction 15, giving rise to the pressure drop P2–P3. The other proportion arrives at the reservoir 24 by passing through the second control restriction 112, which gives rise to the pressure drop P2–P4. The filtering restriction 51 gives rise to the pressure drop P5–P3.

In this way, the mobile valve piston 17 is subjected to the pressure P5 tending to move it upward and to the pressure P6 tending to move it downward (in relation to FIG. 8).

Figure 9:
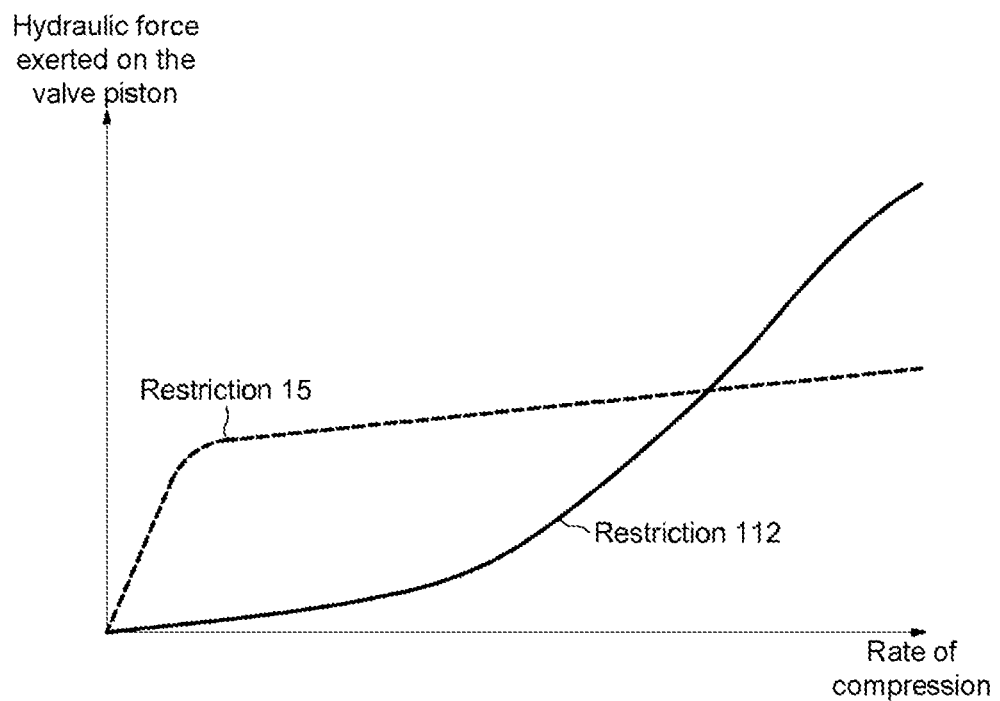
FIG. 9 shows curves of hydraulic force as a function of the rate of compression of the shock absorber.

FIG. 9 depicts curves of the variations in hydraulic force exerted on the faces of the mobile valve piston 17 as a function of the speed of the compression movement of the shock absorber. These forces are dependent on the pressure drop created by the restrictions 15 and 112 the characteristics of which are different. They are also dependent on the difference in the flow rates passing through them, the flow rates of circuits A, B and C being different. These hydraulic forces are finally dependent on the magnitude of the surface areas of the piston 17. In the example of FIG. 8, the two opposite surfaces of the piston 17 have equal areas. In order to obtain the desired effect, the restriction 15 is preferably designed to generate a significant pressure drop at very low rates of compression. When the rate of compression increases, the pressure drop continues to increase, but very weakly. For the hydraulic force, this results in the curve shown in dotted line in FIG. 9. It is possible in this regard to use a nonreturn check valve pressed firmly against its seat by a spring, with no free passage or with reduced free passages. The restriction 112 is preferably designed to create a pressure drop that is negligible at low rates of compression and that increases significantly as the rate of compression increases, so that the hydraulic force it generates exceeds that generated by the restriction 15 upward of a certain rate of compression. For the hydraulic force, that results in the curve depicted in solid line in FIG. 9. The restriction 112 may have significant free passages intended progressively to become saturated as the rate of compression, and therefore the flow rate, increase. The restriction 112 may also comprise a pressure limiter so as to prevent excessive pressure drops from being achieved at very high rates of compression.

At low rates of compression, the flow rate passing through the restrictions is low. The hydraulic pressure in the chamber 19, given the characteristic of the restriction 112, differs only slightly from the pressure prevailing at the split point, whereas the pressure in the chamber 18, given the characteristic of the restriction 15, is itself very much smaller. Under the action of these two pressures, the piston 17 compresses the spring 20 and closes the valve 14. At higher rates of compression, the difference between the pressure at the split point and the pressure in the chamber 19 increases more quickly than the difference between the pressure at the split point and the pressure in the chamber 18. Under the action of these two pressures, the piston 17 rises, the force exerted on the spring 20 is reduced and the valve shutter 14 lifts.

Thus, the two control restrictions 15 and 112, arranged as illustrated in FIG. 8, and of different characteristics as indicated hereinabove, yield a shock absorber with a damping force that is high, for a low rate of compression, and a damping force that is low, for a high rate of compression.

In the example of FIG. 8, the valve 11 is arranged on circuit A. The first control restriction 15 is on circuit B, and the filtering restriction 51 on the duct 37 connecting the valve chamber 18 to circuit B, while the second control restriction 112 is arranged on circuit C. It would be possible to obtain the same result by means of two control restrictions arranged as close as possible to the split point PP, one of them on circuit B and the other on circuit C, the pressure at the inlet to the two restrictions being that of the split point. The first valve chamber 18 would be connected to the outlet of the restriction having a characteristic similar to that of the restriction 15, and the second valve chamber 19 to the outlet of the restriction having a characteristic similar to that of the restriction 112. The filtering may be assured with no preference as to how, by either a slowing piston 21 as in FIG. 3, or a filtering restriction arranged on one of the ducts connecting one of the valve chambers to one of the control restrictions.

It will be noted that the control valve 11 may be arranged with no preference as to location on either circuit A, circuit B or circuit C.

Moreover, the valve shutter 14 of the shock absorber of FIG. 8 comprises at its base a contact ring forming a peripheral projection 128. When the valve shutter 14 lifts, the fluid enters the valve shutter chamber 42 passing between the contact surface of the seat 13 and of the projection 128. Once the projection 128 has been circumvented, the valve shutter 14 offers to the fluid only surfaces that are parallel to the axis of the valve stem 14a. Local fluctuations in pressure generate no force component parallel to the aforementioned axis and therefore liable to open or close the valve shutter. This shutter therefore does not flutter.

In this example, the diameter of the contact ring 128 (at 20 to 25 mm) is greater than the diameter of the inlet orifice 11a of the valve 11. Thus, for the same lift of the valve shutter 14, the passage cross section for the fluid is significantly greater.

During the course of the relaxation phase, the ducts 129 passing through the valve shutter 14 can be used to resupply the first main chamber 5 from the reservoir 24. The very small pressure drop experienced by the fluid passing through the axial ducts 129 is enough to drive the valve shutter 14 against its seat 13 and therefore rapidly return it to its start-of-compression position. The rapid return of the valve shutter to its position during a relaxation makes it possible to avoid jerkiness in the damping force at the start of a compression.

Figure 10:
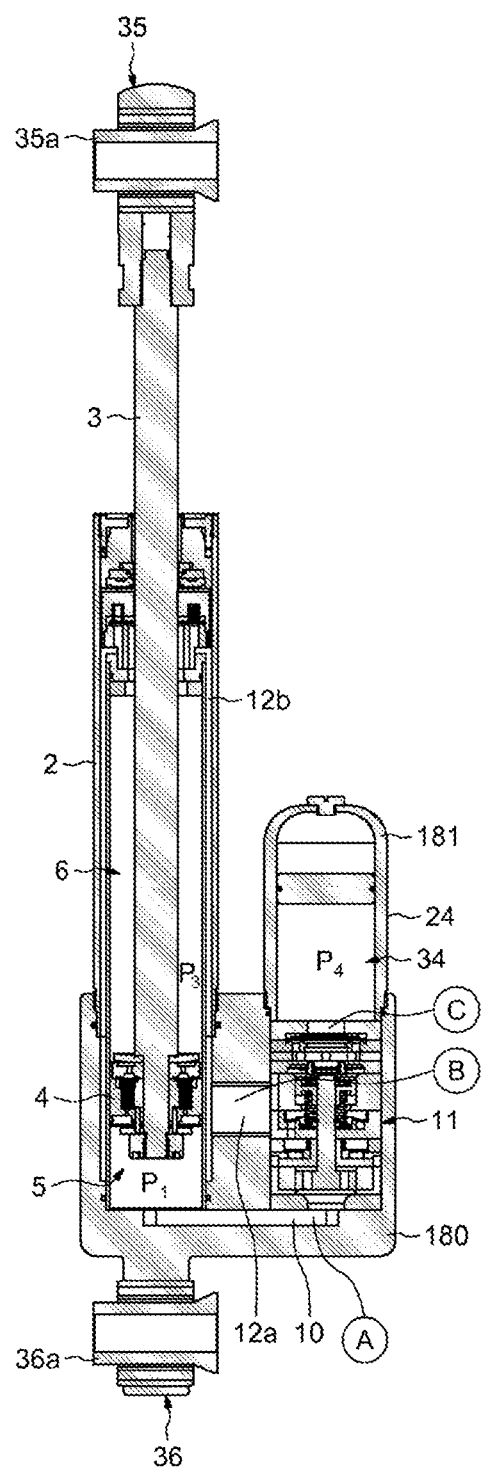
FIG. 10 is a view in longitudinal section of a first practical embodiment of a shock absorber according to the invention.

FIG. 10 is a view in longitudinal section of a shock absorber according to the invention according to one practical embodiment. Components that are similar bear the same references as in the previous figures.

This sectional view makes a distinction between two distinct parts held together by a casing 180. The first part is the body of the shock absorber, comprising the cylinder 2, the rod 3, the main piston 4, the first main chamber 5 and the second main chamber 6. At the end of the rod 3 is the first eye 35 in which is introduced a connecting bar 35a connecting to the bodyshell of the vehicle. At the opposite end, on the casing 180, are the second eye 36 and a connecting bar 36a connected to a wheel of the vehicle.

The casing 180 holds in position a second assembly made up of the valve 11 and of the hydraulic reservoir 24, having a casing cover 181. The reservoir 24 is positioned close to the valve 11 so that the reservoir chamber 34 is adjacent to the valve 11.

FIG. 10 also depicts the pipe 10 which connects the valve 11 to the first main chamber 5. The valve 11 is connected to the second main chamber 6 by a first portion of pipe 12a between the valve 11 and the shock absorber cylinder 2, and a second portion of pipe 12b which corresponds to an intermediate annular zone arranged inside the wall of the shock absorber cylinder 2.

The pressures in the main chambers 5 and 6 are, as in FIG. 8, denoted P1 and P3. The pressure in the chamber 34 of the hydraulic reservoir 24 is denoted P4.

Figure 11:
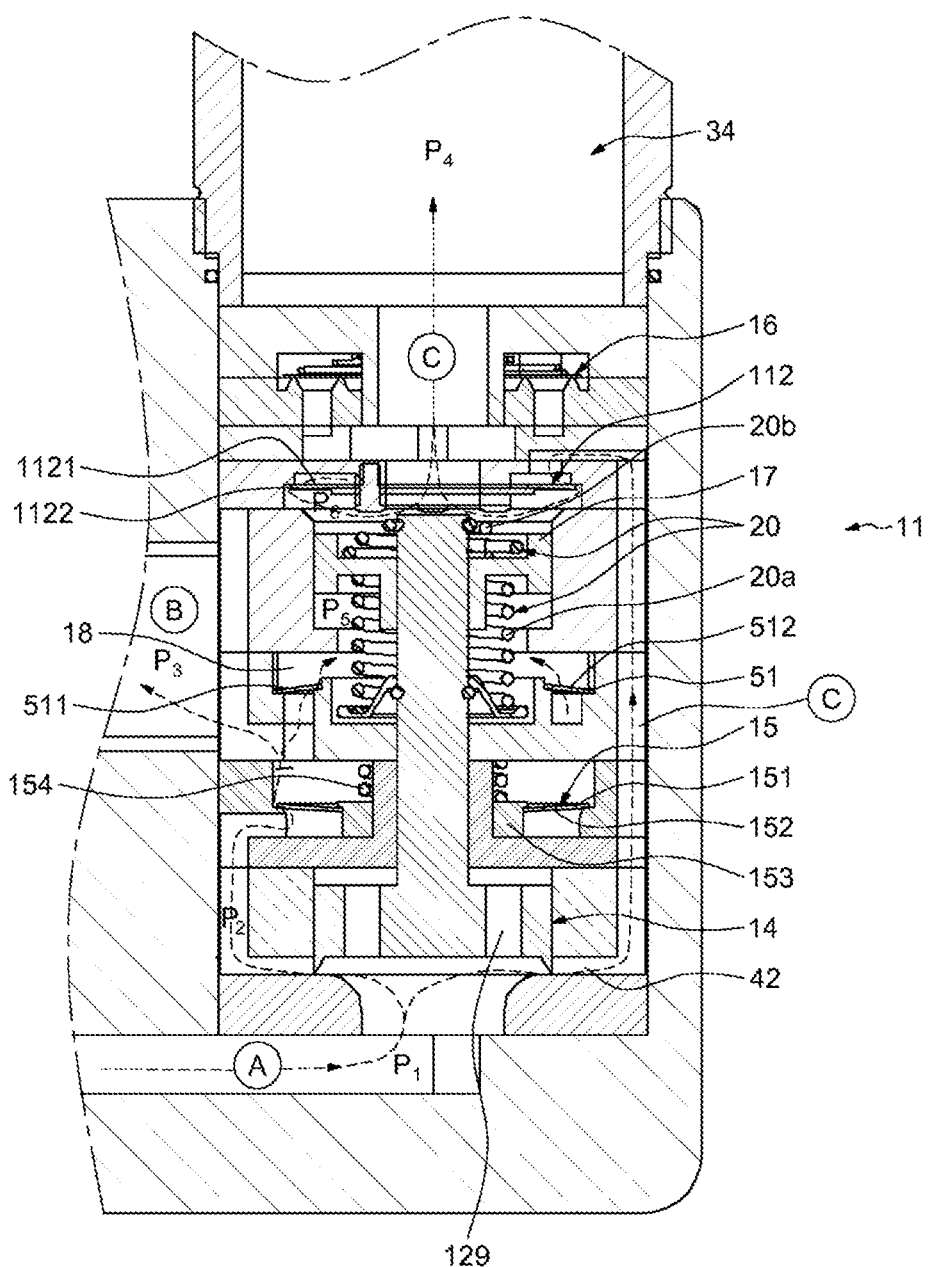
FIG. 11 is an enlarged view in section on two different planes of section of the control valve of the shock absorber of FIG. 10, showing the path of the fluid during a compression movement.

FIG. 11 shows an enlarged view in cross section on two different planes of the control valve 11 of this embodiment. The valve 11 is made up of a collection of cylindrical components kept pressed together using stud bolts, not depicted, that pass right through the valve.

The cross sections in FIG. 11 have been taken in such a way as to show the passages involved during a compression. The flow of the hydraulic liquid during a compression has been depicted in dotted line.

On the left-hand side of the figure it may be seen that the hydraulic liquid coming from the first main chamber 5 of the shock absorber and flowing in circuit A passes in succession via the valve shutter 14, the control restriction 15 and then the filtering restriction 51 before entering the first valve chamber 18. The restriction 15 comprises a foil 151 comprising a very small number of small-diameter orifices 152, kept preloaded against its seat by a piston 153 subject to the thrust of a spring 154. This arrangement makes it possible to obtain the curve shown in dotted line in FIG. 9. The filtering restriction 51 comprises a foil 511 held on its outside diameter, pierced with free passages 512, and very slightly preloaded against its interior support. Thus, when the spring 20 becomes compressed and the damping force increases, only the free passages 512 allow for the flow of the fluid, whereas during relaxation of the spring 20, the fluid can also pass between the interior support and the seat of the foil 511. This makes it possible to achieve asymmetric filtering.

Indeed it may be desirable to introduce asymmetry into the filtering, slowing the flow of fluid more in one direction than in the other, for various reasons connected with the use of the vehicle on which the shock absorber is mounted. In the case of a passenger vehicle it is found, for example, that it is preferable to apply more filtration to the increase in damping force in compression than the decrease thereof.

It is also noted that the valve spring 20 is made up of two springs 20a and 20b working in opposition in order to achieve greater linearity in the response around zero.

On the right-hand part of the cross section in FIG. 11 it may be seen that the hydraulic fluid coming from the first main chamber 5 of the shock absorber passes via the valve shutter 14 and enters the circuit C which leads to the control restriction 112 and to the reservoir 34.

The restriction 112 comprises significant free passages 1121 and a pressure limiting foil 1122.

It is also possible to envision an embodiment similar to that of FIG. 10 in which the reservoir 34 arranged under the cover 181 is replaced by a cylindrical reservoir surrounding the cylinder 2, a duct corresponding to circuit C made in the block 180 connecting the upper part of the valve 11 to the shell acting as a reservoir.

Figure 12:
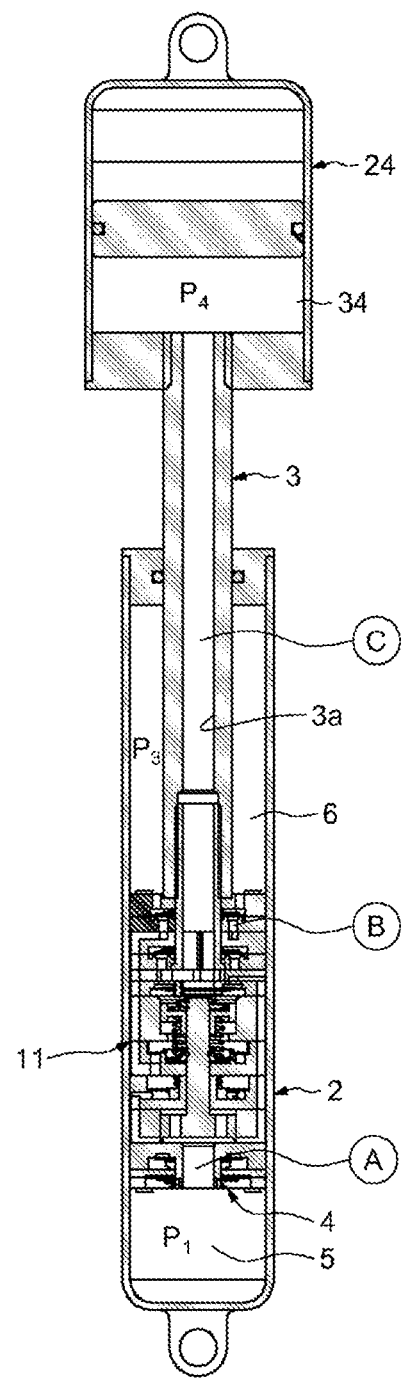
FIG. 12 is a view in longitudinal section of a second practical embodiment of a shock absorber according to the invention.

FIG. 12 depicts a view in cross section of a shock absorber according to a second practical embodiment. This shock absorber is more compact than the shock absorber of FIG. 10 because all of the elements of the shock absorber are contained inside the cylinder or on the rod. Elements that are similar bear the same references as in the preceding figures.

The cylinder 2, the rod 3, the piston 4 delimiting the chambers 5 and 6 are depicted. The valve 11 is incorporated into the inside of the piston 4. The hydraulic fluid reservoir 24 is mounted at the opposite end of the rod 3 to the piston 4. The valve 11 communicates with the reservoir chamber 34 by means of a pipe 3a inside the rod 3, which is therefore a hollow rod. The advantage with such an arrangement is that the assembly is more compact, making such a shock absorber easier to install within, for example, a motor vehicle.

Figure 13:
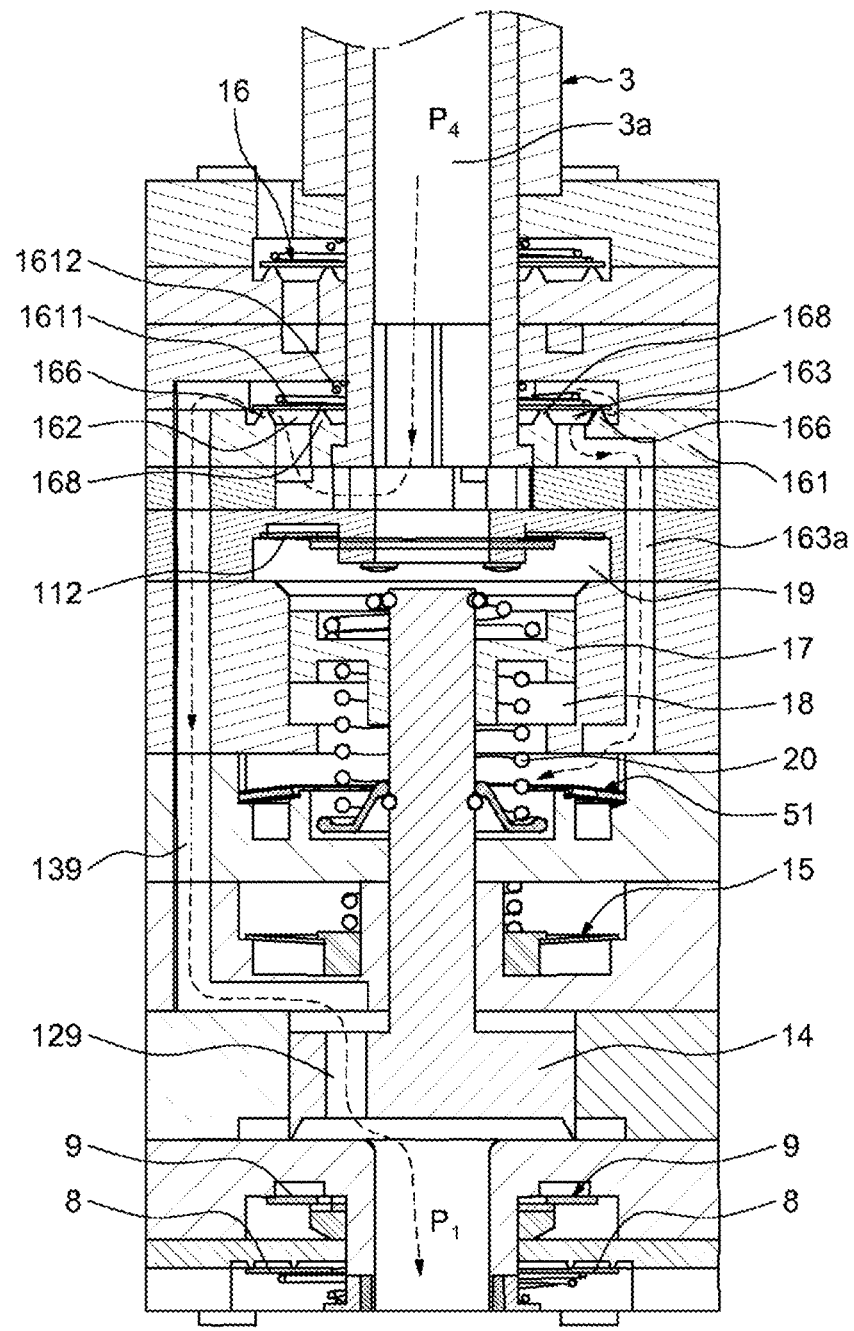
FIG. 13 is an enlarged view in section on two different planes of section of the control valve of the shock absorber of FIG. 12, showing the path of the fluid during a relaxation movement.

FIG. 13 shows an enlarged view in section on two different planes of the control valve 11 of this practical embodiment. Notably it again depicts the filtering restriction 51 that provides asymmetric filtering. Elements that are identical to those of FIG. 11 bear the same references. The cross sections in FIG. 13 have been taken in such a way as to show the passages of the hydraulic fluid during the relaxation leading to the return of the valve shutter 14 onto its seat, and the elimination of the load on the valve spring 20. It will be noted that the hydraulic diagram is the same as for the first example in FIG. 10, the cross sections in FIG. 11 representing the compression circuits and, for the second example in FIG. 12, the cross sections in FIG. 13 representing the circuits that contribute to returning the valve shutter 14 and the piston 17 to their rest positions.

In other words, the hydraulic operation in compression as in relaxation is the same in the two embodiments of FIGS. 10 and 11 on the one hand and 12 and 13 on the other.

During the relaxation, the reservoir supplies the first chamber 5 with the fluid it needs to compensate for the variation in the immersed volume of the rod 3. As illustrated in FIG. 13 in which the flow of the fluid during the relaxation is depicted in dotted line, the fluid originating from the reservoir passes along the hollow rod 3a and arrives in the passages of a component 161 which acts as a nonreturn check valve comprising a foil 1611 kept pressed against the component 161 by a spring 1612. The hydraulic fluid lifts the foil 1611 and, via the passage 139 depicted on the left-hand side of the view in cross section, reaches the valve shutter 14 via which it passes via the passages 129 before arriving at the first chamber 5 of the shock absorber. Thus, the valve shutter 14 is driven against its seat. By lifting the nonreturn foil 1611, the fluid opens other passages in the component 161, thereby allowing the hydraulic fluid to head toward the first chamber 18 of the valve. The piston 17 therefore rises, and the spring 20 relaxes.

Figure 14:
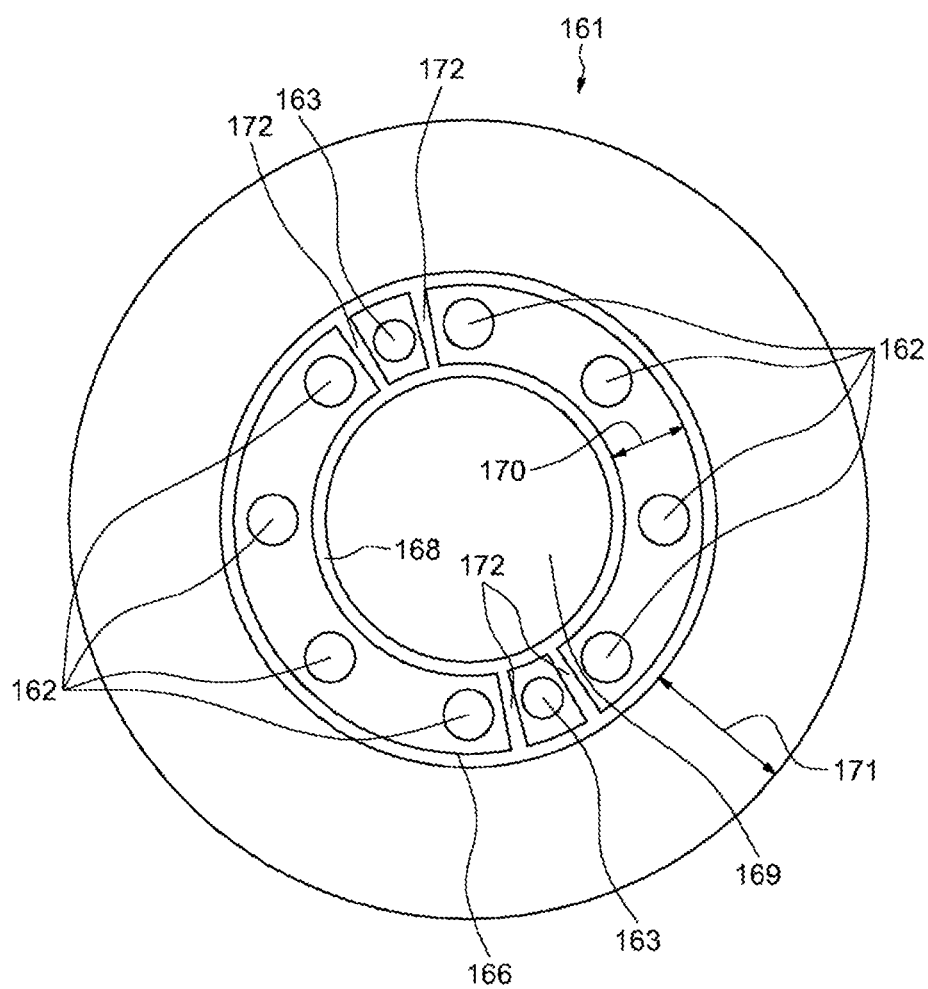
FIG. 14 is a view from above of a component that can be incorporated into a nonreturn check valve of the control valve of FIG. 13, FIG. 15 schematically illustrates a shock absorber according to a fourth embodiment.

FIG. 14 depicts a view from above of the component 161, without the foil 1611. It will be noted that the component 161 with the foil 1611 replaces the nonreturn check valve 25 of the shock absorber of FIGS. 3 to 7, or the nonreturn check valve 144 of the shock absorber of FIG. 8. The component 161 makes it possible to improve the response to a disturbance. Specifically, at the end of a compression movement, if the roadway has a negative unevenness, the shock absorber operates in relaxation mode. In the previous examples of shock absorbers such as that of FIG. 4, the spring 20 can be further compressed because of the filtering restriction 51 which slows the movements of the valve piston 17. During the relaxation, because the valve 11 is isolated from the second compression pipe 12 by the nonreturn check valve 16, this does not disturb operation. Within the valve, the spring 20 tends to push the valve piston 17 back, thereby demanding that hydraulic fluid be transferred between the valve chambers 18 and 19. This transfer is slowed by the control restriction 15 and by the filtering restriction 51. Finally, it is possible that the desired movement of the valve piston 17 may not have been completed by the end of the relaxation.

In order to facilitate this return to the initial conditions, use is advantageously made of the component 161 depicted in FIG. 14.

In the example illustrated, the component 161 comprises an annular groove 170 delimiting a bore 169 on its interior contour. The annular groove 170 is surrounded on the outside by a flat annular zone 171. The bore 169 allows for mounting around the rod 3 as may be seen in FIG. 13. The flat annular zone 171 allows the component 161 to be clamped up with the other components of which the valve 11 is made. The spring 1612 (FIG. 13) presses the foil 1611 firmly against the edges of the annular groove 170.

Distributed in a circle in the annular groove 170 are orifices 162, of which in the example illustrated there are eight, each connected to the hydraulic fluid reservoir 24. Two further orifices 163 are arranged in the groove 170, at the end of pipes 163a communicating with the first chamber 18 of the valve 11. Radial ribs 172 are arranged in the groove 170 on each side of the orifices 163 so as to isolate the orifices 163 from the orifices 162. Outer 166 and inner 168 exterior circular ribs complete the isolation between the orifices 162 and the orifices 163.

The annulus-shaped steel foil 1611 visible in FIG. 13 is held against the component 161 by the spring 1612 (FIG. 13).

During compression, the pressure prevailing in the first main chamber 5 supplements the action of the spring 1612 pressing the foil 1611 against the component 161 and closing off all the orifices 162 and 163. Thus, the first main chamber 5, the first valve chamber 18 and the reservoir 24 of hydraulic fluid are isolated from one another.

During the relaxation, the hydraulic fluid coming from the reservoir 24 passing through the orifices 162 from the bottom upward in FIG. 13 heads toward the first main chamber 5 and lifts the foil 1611 pressing against the ribs 166 and 168 which delimit the annular groove 170. The lifting of the foil 1611 allows hydraulic fluid at the pressure of the reservoir to be made to pass through the orifices 163 which communicate with the first valve chamber 18. The pressure in the latter therefore decreases resulting in a relaxation of the spring 20.

It is possible to envision an example of a shock absorber identical in all respects to the preceding embodiments and into which such a component 161 is incorporated in place of the nonreturn check valve 25 or 144 of the shock absorber.

Finally, the component 161 may simultaneously perform a number of functions:

- during relaxation, it allows the hydraulic fluid contained in the reservoir 24 to enter the first main chamber 5 to compensate for variations in the immersed volume of the rod 3 of the shock absorber (which is the function of a conventional shock absorber nonreturn check valve),
- during relaxation, it allows the hydraulic fluid to circulate freely between the various chambers surrounding the valve piston 17,
- during compression, it prevents the hydraulic fluid leaving the first valve chamber 18 from going to the reservoir 24 (which is the function of a conventional shock absorber nonreturn check valve), and
- during compression, it closes all the connections between the chambers of the valve 11.

Figure 16:
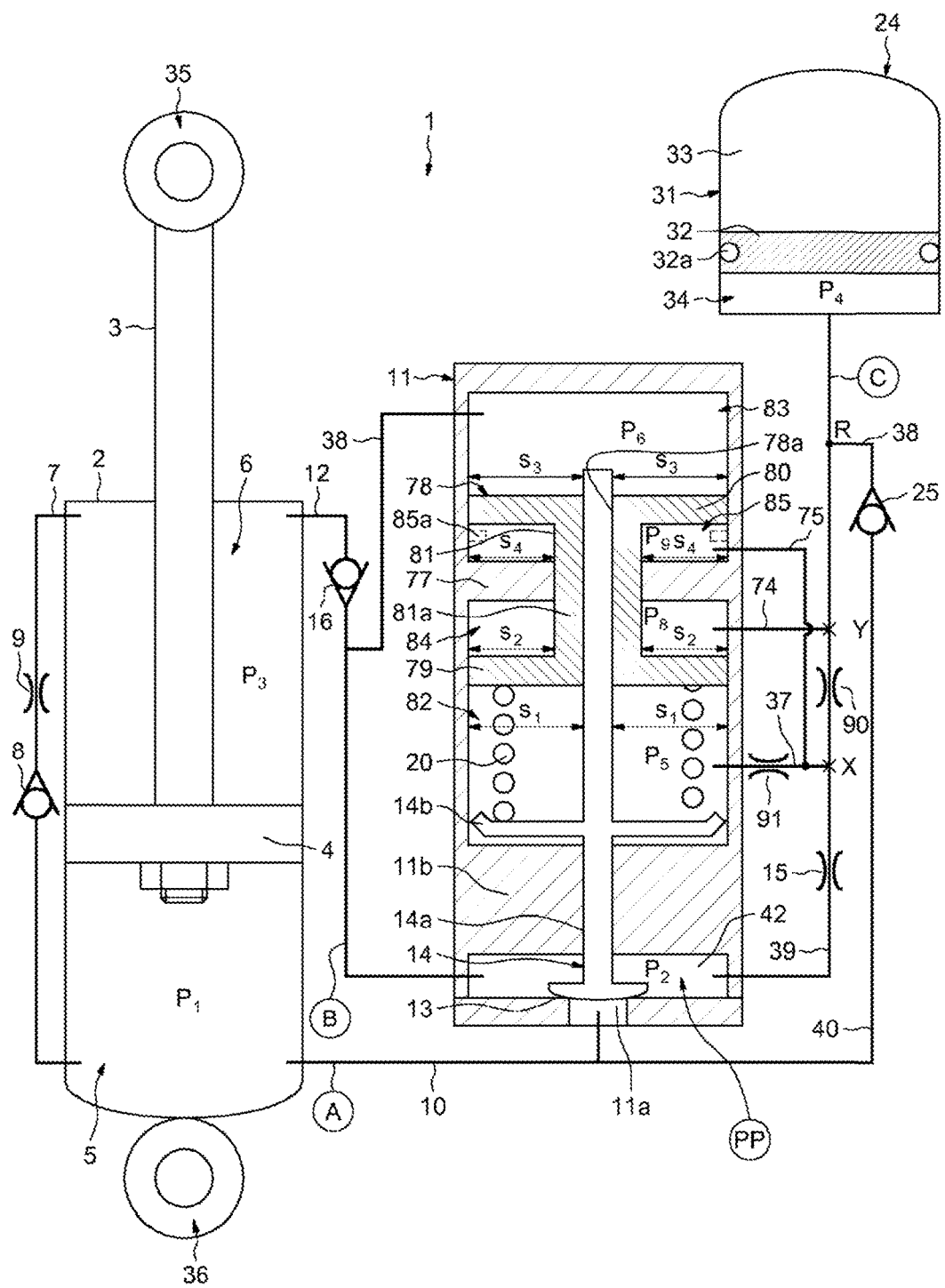
FIG. 16 illustrates a shock absorber according to a fifth embodiment, and FIG. 17 schematically illustrates a shock absorber according to an alternative form of the fifth embodiment of the invention.
Figure 17:
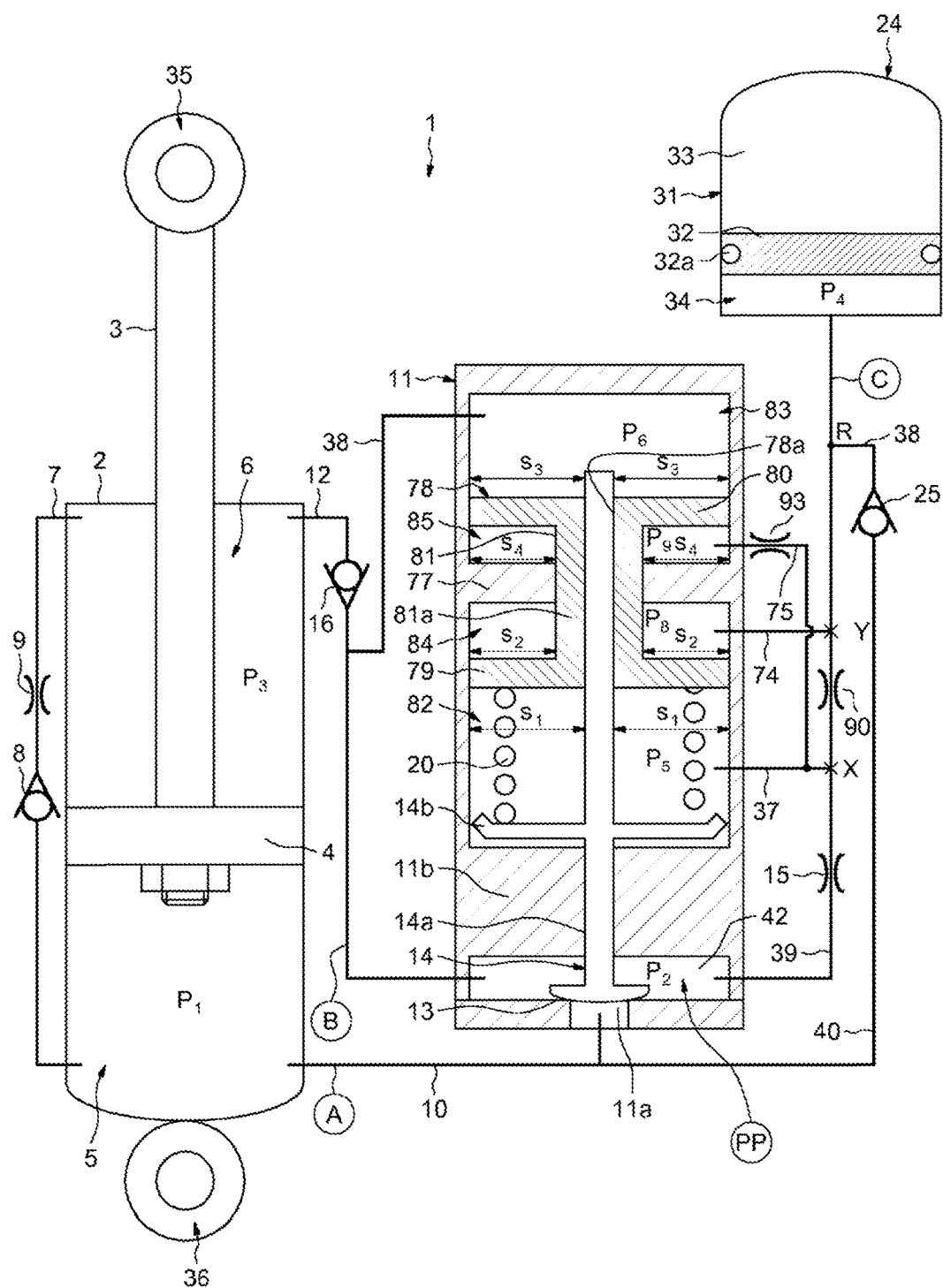

In this example, the action of filling the first valve chamber 18 is enough to relax the spring 20. However, there may be a need to fill or empty other chambers in contact with the mobile valve piston. In other examples it is therefore possible to have other ducts comparable to the ducts 163, isolated from one another and also from the ducts 162 when the foil is pressing against the annular groove 170, these other ducts communicating with other chambers, for example the second valve chamber 19, the two chambers 22a and 22b situated one each side of the slowing piston 21 of FIG. 3 or even the auxiliary chambers such as the first auxiliary chamber 84 and the second auxiliary chamber 85 which are depicted in FIGS. 16 and 17.

The component 161 may therefore advantageously replace the nonreturn check valve 25 situated on the pipe 40 connecting the hydraulic fluid reservoir 24 to the first main chamber 5, this being true of any one of the preceding embodiments.

Figure 15:
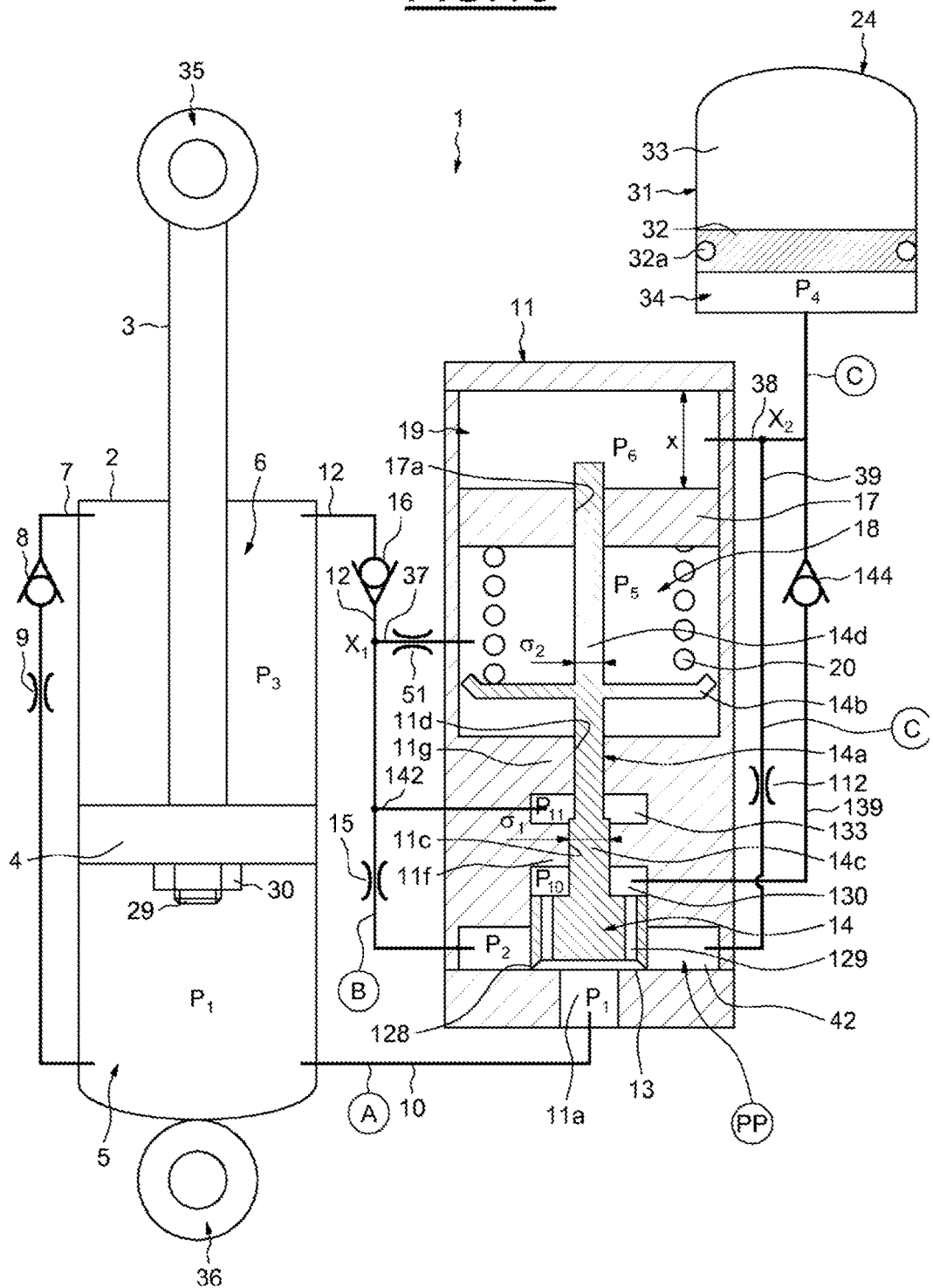

A fourth embodiment is illustrated in FIG. 15 in which the elements that are identical bear the same references. In this embodiment, the mobile valve shutter 14 comprises a valve stem 14a having a first stem portion 14c, of cross section a1 and a second stem portion 14d, of cross section $\sigma 2$ smaller than a1. The second stem portion 14d is secured to the plateau-shaped shoulder 14b against which the spring 20 rests. The stem portions 14c and 14d are able to slide in respective bores 11c and 11d made in two internal walls 11f and 11g of the control valve 11. The valve shutter 14 is identical to that of FIG. 8. It moves in the additional chamber 130. Furthermore, made in the control valve 11 is a second additional chamber 133, in communication with the pipe 15 of circuit B via a pipe 142, downstream of the control restriction 15 during a compression movement.

The following pressures are defined here in addition to the pressures P1 to P6 already defined for the embodiment of FIG. 8:

- the pressure P10 is the pressure in the first additional chamber 130, and
- the pressure P11 is the pressure in the second additional chamber 133.

The following equalities can be written: P10=P1, P11=P3 and P6=P4.

The fluid expelled from the first main chamber 5 during a compression is slowed by the valve shutter 14, creating the pressure drop P1–P2, entering the valve shutter chamber 42. A large proportion of the flow is directed toward the second main chamber 6, passing through the first control restriction 15, creating the pressure drop P2–P3. The other proportion goes to the reservoir 24 passing through the second control restriction 112, creating the pressure drop P2–P4. The filtering restriction 51 creates the pressure drop P5–P3.

In this way, the mobile valve shutter 14 is subjected to three pressures over three different cross sections.

First, it is subjected to the pressure P1 of the fluid arriving via the inlet orifice 11a of the control valve 11, over the surface area SV of the valve shutter that faces the orifice 11a and the seat 13. In the opposite direction, it is subjected to the pressure P10 of the fluid present in the first auxiliary chamber 130, over a surface area equal to the difference between the surface area SV and the surface area $\sigma 1$ of the first part of the valve stem 14c. Moreover, the pressures P1 and P10 are substantially equal, thanks to the pipes 129. Finally, the mobile valve shutter 14 is subjected to a first upward load (with respect to FIG. 15) generated by a first pressure P1 on a first equivalent cross section a1.

Secondly, the cross section $\sigma 2$ of the stem 14d of the valve shutter 14, in the second auxiliary chamber 133, creates a second cross section ($\sigma 1$-$\sigma 2$) to which the pressure P11 prevailing in the second auxiliary chamber 133, and which is equal to the pressure P3 because of the communicating pipe 142, is applied. The mobile valve shutter 14 is therefore subjected to a second load directed downward (with respect to FIG. 15), generated by the pressure P3 on the cross section ($\sigma 1$-$\sigma 2$).

Thirdly, the higher surface $\sigma 2$ of the second part of the stem 14d is subjected to the pressure P6 of the second control chamber 19 which pressure is equal to the pressure P4 of the reservoir because of the pipe 38. The mobile valve shutter 14 is therefore subjected to a third load directed downward (with respect to FIG. 15), generated by the pressure P4 on the cross section $\sigma 2$.

Finally, the total hydraulic force FY applied to the valve shutter 14 can be written thus:

$$FY = P1 \cdot \sigma 1 - P3 \cdot (\sigma 1 - \sigma 2) - P4 \cdot \sigma 2$$

As indicated in the description of FIG. 3, the damping force can be written;

$$FA = P1 \cdot SP - P3 \cdot (SP - ST) - P4 \cdot ST,$$

where SP is the cross section of the main piston 4 and ST is the cross section of the main rod 3.

If $\sigma 1$ and $\sigma 2$ are chosen to be in the same ratio as SP and ST then the following relationship:

$$FA = b \cdot FY,$$

can be obtained, where b is the coefficient of proportionality to scale from a cross section of the main piston 4 to the corresponding cross section of the valve stem of the valve shutter 14.

The damping force is therefore, to within a multiplicative scaling factor, equal to the sum of the hydraulic forces acting on the valve shutter 14 or, and this amounts to the same, to the force exerted by the spring 20.

By virtue of this stepped structure of the stem 14a of the valve shutter 14 and the corresponding structure of the control valve 11, the filtering applies to the entire damping force. This arrangement may be achieved in the preceding embodiments.

FIG. 16, in which elements that are identical bear the same references shows a fifth embodiment using a valve piston of special structure.

The mobile valve piston 78 illustrated in FIG. 16 comprises a central part 81a and a groove 81 situated between two identical end plates 79 and 80. The end plates 79 and 80 together with a dividing partition 77 of the valve 11 delimit four chambers, namely:

a first valve chamber 82,
a second valve chamber 83,
a first auxiliary chamber 84, and
a second auxiliary chamber 85.

The surface S1 is designated as being the lower surface of the end plate 79, delimiting the first valve chamber 82. The surface S1 is also equal to the higher surface S3 of the end plate 80, delimiting the second valve chamber 83. The surface S2 on which the pressure prevailing in the first auxiliary chamber 84 is exerted is the surface area of the end plate 79 from which the cross sectional area of the central part 81a has been subtracted. This surface area S2 is equal to the surface area S4 on which the pressure prevailing in the second auxiliary chamber 85 is applied.

The first control restriction 15 and the second control restriction 90 are mounted on the pipe 39 (circuit C).

A point X, situated on the pipe 39 between the two control restrictions 15 and 90, and a point Y, situated on the same pipe 39 between the control restriction 90 and the point R are also referenced.

The pipe 37 connects the point X to the first valve chamber 82. The shock absorber further comprises a first connecting pipe 74 connecting the point Y to the first auxiliary chamber 84, and a second connecting pipe 75, connecting the point X to the second auxiliary chamber 85.

The pipe 37 is equipped with a filtering restriction 91.

Thus, in this shock absorber, the control valve 11 is arranged on circuit A, whereas the two control restrictions 15, 90 are mounted on circuit C.

The filtering restriction 91 is mounted on the pipe connecting the first valve chamber 82 to circuit C. The second valve chamber 83 is connected via a pipe 38 to the pipe 12 upstream of the nonreturn check valve 16 on circuit B. The pressure P6 in the second valve chamber 83 is therefore equal to the pressure P2 prevailing in the valve shutter chamber 42.

The following new pressures are defined in this example:
the pressure P8 is the pressure in the first auxiliary chamber 84, and
the pressure P9 is the pressure in the second auxiliary chamber 85.

When operating in compression: P6=P2 and P8=P4.

The two restrictions 15 and 90 have different characteristics so as to obtain a law of damping under compression which, as the speed of the movement increases, increases first of all, reaches a maximum, then decreases at high speeds. It is possible in this respect to use two control restrictions 15 and 90 having characteristics such as those that make it possible to obtain the curves of FIG. 9. The restriction 90 corresponds to the restriction 112 of FIG. 8.

The mobile valve piston 78 is subjected to the following mutually opposing pressure forces:
a first force (P2−P5)·S1, tends to cause the piston to slide downward, and
a second force (P9−P8)·S2 tends to cause the piston to slide upward.

At low rates of compression, the hydraulic force associated with the pressure difference (P2−P5) predominates over the hydraulic force associated with the pressure difference (P9−P8). The resultant of these two forces acts on the piston 78 in such a way as to compress the spring 20 and cause the damping force to increase.

At high rates of compression, the two mutually opposing hydraulic forces are higher, but the one created by the pressure difference (P9−P8) predominates over the other, causing the piston 78 to rise and the valve 14 to open. The filtering restriction 91, mounted on the pipe 37, namely between the first chamber 82 and the circuit C, adds to the calculation of the damping force a term that is governed by a first-order filtering equation, as mentioned for the previous embodiments. The unfiltered term is particularly small because the two pressure drops across the restrictions 15 and 90 which are the root cause of this unfiltered term act only on the flow of hydraulic fluid corresponding to the cross section of the rod 3 of the shock absorber, which is small in comparison with the cross section of the main piston 4.

In this embodiment, like in the embodiment of FIG. 3, the movement of the mobile valve piston 78 may be limited by an optional limit stop so as to impose an upper limit on the damping force. The limit stop is positioned in the path of the piston 78, inside one of the valve chambers. As in the embodiment of FIG. 3, the limit stop may be placed in the first valve chamber 82. As an alternative, as depicted in FIG. 16, the limit stop 85a depicted in dotted line is placed inside the second auxiliary chamber 85.

FIG. 17 depicts an alternative form of the shock absorber of FIG. 16 which differs from the shock absorber of FIG. 16 in that the filtering restriction 93 is mounted on the pipe 75 between the second auxiliary chamber 85 and the circuit C.

The action of the control restrictions 15 and 90 on the movements of the piston 78, of the spring 20 and of the valve shutter 14 is identical to that which was described in respect of FIG. 16.

As for the filtering restriction 93, the flow of hydraulic fluid passing through that is dependent only on the movement of the piston 78 inside the valve 11. As in the preceding embodiments, the filtering restriction 93 introduces first-order filtering into the largest proportion of the damping force.

As an alternative, the filtering restriction 93 may also be mounted on the duct 74 connecting the first auxiliary chamber 84 to the circuit C.

The two control restrictions 15 and 90, the characteristics of which are preferably different so as to obtain the curves of FIG. 9, may be mounted the other way around: the restriction 90 may be close to the valve shutter 14 and the restriction 15 further downstream in the flow. The restriction 15 should then be mounted between the second chamber 83 and the first chamber 82 and the restriction 90 between the second auxiliary chamber 85 and the first auxiliary chamber 84.

As an alternative, it is also possible to mount the restriction 15 between the auxiliary chambers 84, 85 and the restriction 90 between the two valve chambers 82, 83. In both instances, the two control restrictions 15 and 90 need to be mounted in such a way that the restriction 15 acts in a direction that tends to close the valve 14, and the restriction 90 in an opposite direction.

All these variations regarding the position of the control restrictions may also be applied to the embodiment of FIG. 16.

It is possible to have recourse to a valve piston like the one illustrated in FIGS. 16 and 17 where there is a desire to obtain the same type of damping law as the one permitted by the diagram of FIG. 9 (force increasing and then decreasing) and when there is only a circuit A as in the case of the shock absorber of FIG. 1 without a circuit B or a circuit C or a split point PP.

In other embodiments, this type of valve piston also makes it possible to arrange the two control restrictions on the same circuit A, B or C. Arranging the two control restrictions on circuit C makes it possible to decrease the non-filtered proportion of the damping force. As an alternative, the two control restrictions may be mounted on two different circuits, for example one on circuit C as in FIGS. 16 and 17 and the other on circuit B.

The addition of an optional limit stop like the one referenced 18a and depicted in dotted line in FIG. 3, or referenced 85a and depicted in dotted line in FIG. 16 makes it possible to limit the damping force in compression. Such a limit stop may easily be added to each of the embodiments depicted in FIGS. 3 to 8, 10 to 13 and 15 to 17. If such a limit stop is added, the damping law is dependent on the action of the control and filtering restrictions and on the position of the limit stop. The action of such a limit stop on the damping law is felt all the more keenly by the driver when the rate of compression falls within a mid-speed range. What is then felt is a damping force that increases, hits a ceiling, then decreases.

In certain embodiments, the limit stop may be fixed. In other embodiments, the position of the limit stop may be adjusted so as to control the shock absorber remotely.

In order to adjust the shock absorber characteristic, it is also possible to use control restrictions and/or filtering restrictions that are controlled, which means to say that can be altered remotely. This possibility, which was proposed with reference to the restriction 15 in FIG. 3 and to the restriction 51 in FIG. 4, can be applied to the control restrictions and to the filtering restrictions used in all the embodiments described hereinabove.

In general, it will be noted that all the distinctive features described with reference to the various figures can be used in the embodiments of the other figure.

The invention claimed is:

1. A shock absorber notably for a motor vehicle, comprising a cylinder adapted to contain a hydraulic fluid, a main piston actuated by a rod, defining within the cylinder a first main chamber and a second main chamber, the second main chamber containing the rod, a reservoir of hydraulic fluid and a valve placed in a flow of hydraulic fluid between the first main chamber and the second main chamber or between the first main chamber and the reservoir, the valve comprising a mobile shutter collaborating with a seat, a spring tending to press the mobile shutter onto its seat, and a mobile valve piston defining within the valve a first valve chamber and a second valve chamber, said mobile valve piston being able to compress the spring and close the valve, the shock absorber further comprising in combination:

a control restriction mounted in a flow of the hydraulic fluid emanating from the first main chamber during a compression movement, the control restriction being able to generate a pressure difference acting upon two respective faces of the mobile valve piston in a direction that tends to compress the spring during the compression movement, and a means for slowing a movement of the mobile valve piston during the compression movement.

2. The shock absorber as claimed in claim 1, in which the means for slowing comprises a filtering restriction placed in the flow of the fluid caused by the movement of the mobile valve piston.

3. The shock absorber as claimed in claim 2, in which the filtering restriction is designed to slow the flow more in one direction than in the other so as to produce asymmetric filtering.

4. The shock absorber as claimed in claim 1, in which a first circuit (A) connects the first main chamber to a flow split point (PP), a second circuit (B) connects the split point (PP) to the second main chamber and a third circuit (C) connects the split point (PP) to the reservoir, the valve and the control restriction being arranged on one of the aforementioned circuits.

5. The shock absorber as claimed in claim 4, in which the valve and the control restriction are arranged on the same circuit, the control restriction being arranged upstream or downstream of the valve during a compression movement.

6. The shock absorber as claimed in claim 4, characterized in that a second control restriction is mounted on one of the aforementioned circuits, and is able to generate a pressure difference acting on the respective faces of the mobile valve piston in a direction that tends to reduce the tension in the spring, during a compression movement, the characteristics of the two control restrictions preferably being different.

7. The shock absorber as claimed in claim 6, characterized in that the mobile valve piston comprises two endplates separated by a peripheral groove so as to form, with an interior dividing partition inside the valve, a first auxiliary chamber and a second auxiliary chamber, a filtering restriction being mounted in the flow of the fluid brought about by the movement of the mobile valve piston.

8. The shock absorber as claimed in claim 1, in which the reservoir comprises a gas chamber with a mobile wall arranged in the cylinder near its opposite end to the rod of the main piston, a single circuit connecting the first main chamber to the second main chamber, the valve being arranged in said circuit with the control restriction upstream or downstream of the valve during a compression movement.

9. The shock absorber as claimed in claim 1, characterized in that the mobile shutter comprises a contact ring forming a peripheral annular projection on its base and a plurality of axial ducts.

10. The shock absorber as claimed in claim 1, characterized in that the valve stem of the mobile shutter comprising a first part having a first cross section and a second part having a second cross section, the control valve comprises a first additional chamber and a second additional chamber, inside which chambers the first part of the valve stem of the mobile shutter can move.

11. The shock absorber as claimed in claim 10, in which the ratio of the first cross section of the first part to the second cross section of the second part of the valve stem of the mobile shutter is the same as the ratio of the surface area of the main piston of the shock absorber to the cross section of the rod of the shock absorber.

12. The shock absorber as claimed in claim 1, characterized in that the reservoir of hydraulic fluid is connected to the first main chamber by a pipe on which there is arranged a connecting piece acting both as a check valve and as a point of connection between a plurality of pipes which connect to one another, during a release, at least one of the chambers adjacent to the mobile valve piston and the reservoir of hydraulic fluid.

13. The shock absorber as claimed in claim 1, characterized in that the valve is arranged on the outside of the shock absorber and is connected to the two main chambers.

14. The shock absorber as claimed in claim 1, characterized in that the valve and the various restrictions are mounted in the main piston, the rod is hollow and causes the valve to communicate with a reservoir arranged at the opposite end of the rod to the main piston.

15. The shock absorber as claimed in claim 1, wherein the damping force can be altered either by means of a limit stop, possibly a mobile stop, or by means of a control restriction and/or of a filtering restriction that can be controlled remotely.

* * * * *